United States Patent
Zhang et al.

(10) Patent No.: US 9,992,791 B2
(45) Date of Patent: Jun. 5, 2018

(54) METHOD FOR CONTROLLING UPLINK SIGNAL TRANSMISSION AND APPARATUS THEREOF

(71) Applicant: Huawei Technologies Co., Ltd., Shenzhen (CN)

(72) Inventors: Tao Zhang, Beijing (CN); Bo Lin, Beijing (CN); Yuhua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 14/702,303

(22) Filed: May 1, 2015

(65) Prior Publication Data
US 2015/0237648 A1  Aug. 20, 2015

Related U.S. Application Data

(63) Continuation of application No. PCT/CN2012/084006, filed on Nov. 2, 2012.

(51) Int. Cl.
*H04J 3/06* (2006.01)
*H04W 72/12* (2009.01)
*H04W 76/04* (2009.01)

(52) U.S. Cl.
CPC ... *H04W 72/1268* (2013.01); *H04W 72/1289* (2013.01); *H04W 76/048* (2013.01)

(58) Field of Classification Search
None
See application file for complete search history.

(56) References Cited

U.S. PATENT DOCUMENTS

2009/0232118 A1* 9/2009 Wang ............... H04L 5/0091
370/338
2010/0080155 A1* 4/2010 Suzuki ............... H04W 4/20
370/310

(Continued)

FOREIGN PATENT DOCUMENTS

CN  101132350 A  2/2008
CN  101232696 A  7/2008

(Continued)

OTHER PUBLICATIONS

"3rd Generation Partnership Project; Technical Specification Group Radio Access Network; Requirements for further advancements for Evolved Universal Terrestrial Radio Access (E-UTRA) (LTE-Advanced) (Release 11)," 3GPP TR 36.913, V11.0.0, Sep. 2012, 15 pages.

(Continued)

*Primary Examiner* — Kwang B Yao
*Assistant Examiner* — Juvena Loo
(74) *Attorney, Agent, or Firm* — Slater Matsil, LLP

(57) ABSTRACT

The invention discloses a method for controlling uplink signal transmission, a user equipment, and a base station. The method for controlling uplink signal transmission includes receiving uplink signal configuration information sent by a base station; sending an uplink signal to the base station according to the uplink signal configuration information before a first timer expires; stopping sending an uplink signal to the base station when the first timer expires; receiving trigger information sent by the base station, and restarting the first timer according to the trigger information; and sending an uplink signal to the base station before the restarted first timer expires.

24 Claims, 12 Drawing Sheets

(56) References Cited

U.S. PATENT DOCUMENTS

| | | | |
|---|---|---|---|
| 2010/0165953 A1 | 7/2010 | Chen et al. | |
| 2010/0325226 A1* | 12/2010 | McBeath | H04W 56/00 709/206 |
| 2011/0026625 A1* | 2/2011 | Susitaival | H04W 52/0251 375/260 |
| 2011/0182224 A1* | 7/2011 | Ishii | H04W 56/005 370/311 |
| 2011/0183701 A1* | 7/2011 | Ohta | H04W 56/0045 455/509 |
| 2011/0243102 A1* | 10/2011 | Sebire | H04W 56/0045 370/336 |
| 2011/0319065 A1* | 12/2011 | Dalsgaard | H04L 1/0027 455/418 |
| 2012/0207040 A1* | 8/2012 | Comsa | H04W 72/1215 370/252 |
| 2012/0281566 A1* | 11/2012 | Pelletier | H04W 76/046 370/252 |
| 2013/0084848 A1* | 4/2013 | Dalsgaard | H04W 76/048 455/422.1 |
| 2013/0163537 A1* | 6/2013 | Anderson | H04W 72/1284 370/329 |
| 2014/0086161 A1* | 3/2014 | Cai | H04W 72/042 370/329 |
| 2014/0086219 A1* | 3/2014 | Suzuki | H04W 56/0005 370/336 |
| 2014/0161117 A1* | 6/2014 | Sebire | H04W 56/0045 370/350 |
| 2014/0198701 A1* | 7/2014 | Ostergaard | H04W 76/048 370/311 |
| 2014/0198762 A1* | 7/2014 | Yang | H04W 56/0005 370/329 |
| 2015/0003355 A1* | 1/2015 | Dalsgaard | H04W 72/0413 370/329 |

FOREIGN PATENT DOCUMENTS

| | | |
|---|---|---|
| CN | 101771517 A | 7/2010 |
| CN | 102647757 A | 8/2012 |
| WO | 2010092422 A1 | 8/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.3.0, Sep. 2012, 205 pages.

"3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.0.0, Sep. 2012, 55 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.1.0, Sep. 2012, 325 pages.

Ericsson et al., "Periodic CSI and SRS at DRX state change," 3GPP TSG-RAN WG2 #79, Tdoc R2-123863, Aug. 13-17, 2012, 7 pages.

* cited by examiner

METHOD FOR CONTROLLING UPLINK SIGNAL TRANSMISSION AND APPARATUS THEREOF

This application is a continuation of International Application No. PCT/CN2012/084006, filed on Nov. 2, 2012, which is hereby incorporated by reference in its entirety.

TECHNICAL FIELD

Embodiments of the present invention relate to the communications field, and more specifically, to a method for controlling uplink signal transmission and an apparatus thereof.

BACKGROUND

A channel quality indicator ("CQI" for short) and a sounding reference signal ("SRS" for short) that are sent by a user equipment ("UE" for short) to a base station may be collectively referred to as an uplink signal. The base station can obtain states of uplink and downlink channels of the UE according to an uplink signal sent by the user equipment, and help schedule uplink and downlink data of the UE to a proper channel resource for sending. When the UE needs to send an uplink signal to a cell of the base station, the UE needs to obtain uplink signal configuration. Therefore, the base station needs to send uplink signal configuration information to the UE to notify the UE of a period and a time-frequency resource for sending the uplink signal. In addition, the UE needs to obtain timing advance ("TA" for short) relative to the cell. Therefore, the base station needs to send a timing advance command ("TAC" for short) to the UE, so as to help the UE determine and adjust the TA.

TA of a particular UE relative to a particular cell varies with factors such as a location of the UE and a size of the cell. Therefore, the UE starts or restarts a time alignment timer ("TAT" for short) each time the UE obtains a TAC from the base station, and when the TAT expires, the UE considers that a TA value corresponding to the TAC is no longer valid. To prevent uplink interference, the UE terminates transmission of all uplink signals except a random access request, and releases the uplink signal configuration, so that the base station reuses all or some of resources indicated by the uplink signal configuration, so as to improve utilization efficiency of uplink resources. Later, when uplink data arrives, the UE initiates a contention-based random access procedure to the base station, and obtains a TAC in this process to make the UE restart the TAT, the base station sends uplink signal reconfiguration information to the UE, and then the UE begins sending an uplink signal to the base station; when downlink data arrives, the base station also needs to send uplink signal reconfiguration information and a TAC to the UE, so that the UE begins sending an uplink signal and performs uplink and downlink data transmission.

However, when there are relatively few users in the cell, after the UE releases the uplink signal configuration, the base station may not reuse resources indicated by the uplink signal configuration for another UE, but when uplink data or downlink data arrives, the base station still needs to send reconfiguration information to the UE, so as to resend the previous uplink signal configuration to the UE. Redundant signaling means a longer control delay, which delays sending of uplink and downlink data, and degrades user experience. Furthermore, when a cell is small enough, regardless of a location of the UE in the cell, TA of the UE relative to the cell is zero; in this case, a TAC obtained by the UE during a random access procedure or actively sent by the base station is definitely zero, but the UE still needs to perform the random access procedure.

The random access procedure is a relatively tedious and time-consuming process, which also delays sending of uplink and downlink data, and degrades user experience. In addition, in some cases, for example, the cell is small enough or the UE is still for a long time, TA of the UE relative to the cell may not need to be adjusted in a relatively long time, and therefore, relatively long timing duration of the TAT may be set. In this case, the TAT can hardly expire. As long as the TAT does not expire, no matter whether uplink and downlink data needs to be sent, the UE sends an uplink signal to the base station according to uplink signal configuration. The uplink signal is useless, and sending the useless uplink signal wastes valuable battery power of the UE. In this case, merely setting a relatively short TAT increases signaling overheads for maintaining the TAT, and causes the TAT to expire more easily. As a result, the foregoing two disadvantages become more serious.

Therefore, in some cases of the prior art, the random access procedure or uplink signal reconfiguration is unnecessary, and a useless uplink signal is sent. Sending of the unnecessary control signaling and the useless uplink signal delays sending of uplink and downlink data, wastes system overheads and power of the user equipment, and degrades user experience.

SUMMARY

Embodiments of the present invention provide a method for controlling uplink signal transmission, a user equipment, and a base station, which can implement that a random access procedure and/or sending of uplink signal reconfiguration information is not performed when a timer for controlling uplink signal sending is restarted.

According to a first aspect, an embodiment of the present invention provides a method for controlling uplink signal transmission, and the method includes: receiving uplink signal configuration information sent by a base station; sending an uplink signal to the base station according to the uplink signal configuration information before a first timer expires; stopping sending an uplink signal to the base station when the first timer expires; receiving trigger information sent by the base station, and restarting the first timer according to the trigger information; and sending an uplink signal to the base station before the restarted first timer expires.

With reference to the first aspect, in a first possible implementation manner, the first timer is a time alignment timer TAT; the method further includes: receiving first instruction information sent by the base station, where the first instruction information is used to instruct a user equipment to send, according to the uplink signal configuration information and before the restarted time alignment timer expires, the uplink signal to the base station; and the sending an uplink signal to the base station before the restarted first timer expires includes: sending the uplink signal to the base station according to a timing advance value of the user equipment and the first instruction information before the restarted time alignment timer expires.

With reference to the first aspect, in a second possible implementation manner, the first timer is a time alignment timer TAT; the method further includes: releasing the uplink signal configuration information when the time alignment timer expires; and receiving uplink signal reconfiguration information sent by the base station; and the sending an uplink signal to the base station before the restarted first timer expires includes: sending the uplink signal to the base station according to a timing advance value of the user equipment and the uplink signal reconfiguration information before the restarted time alignment timer expires.

With reference to the first possible implementation manner of the first aspect or with reference to the second possible implementation manner of the first aspect, in a third possible implementation manner, the method further includes: receiving second instruction information and scheduling request configuration information that are sent by the base station, where the second instruction information is used to instruct the user equipment to send, when uplink data arrives, a scheduling request to the base station; and sending a scheduling request to the base station according to the second instruction information and the scheduling request configuration information when uplink data arrives; and the receiving trigger information sent by the base station includes: receiving the trigger information sent by the base station according to the scheduling request.

With reference to the first aspect or with reference to any possible implementation manner of the first to third possible implementation manners of the first aspect, in a fourth possible implementation manner, the trigger information is a physical downlink control channel PDCCH or a timing advance command TAC.

With reference to the first aspect, in a fifth possible implementation manner, the first timer is a time alignment timer TAT; the method further includes: receiving first instruction information sent by the base station, where the first instruction information is used to instruct the user equipment to send, according to the uplink signal configuration information and before the restarted time alignment timer expires, the uplink signal to the base station; the receiving trigger information sent by the base station includes: receiving a timing advance command sent by the base station; and the sending an uplink signal to the base station before the restarted first timer expires includes: sending the uplink signal to the base station according to the received timing advance command and the first instruction information before the restarted time alignment timer expires.

With reference to the fifth possible implementation manner of the first aspect, in a sixth possible implementation manner, the method further includes: sending a random access request message to the base station when the time alignment timer expires and uplink data arrives; and the receiving a timing advance command sent by the base station includes: receiving a random access response message sent by the base station according to the random access request message, where the random access response message carries the timing advance command.

With reference to the first aspect, in a seventh possible implementation manner, the first timer is an uplink signal control timer, where the uplink signal control timer is used to control whether the user equipment sends the uplink signal to the base station; the method further includes: receiving timing duration of the uplink signal control timer sent by the base station; and the sending an uplink signal to the base station before the restarted first timer expires includes: sending the uplink signal to the base station according to a timing advance value of the user equipment and the uplink signal configuration information before the restarted uplink signal control timer expires.

With reference to the seventh possible implementation manner of the first aspect, in an eighth possible implementation manner, the method further includes: receiving scheduling request configuration information sent by the base station; and sending a scheduling request to the base station according to the scheduling request configuration information when uplink data arrives; and the receiving trigger information sent by the base station includes: receiving the trigger information sent by the base station according to the scheduling request.

With reference to the seventh possible implementation manner of the first aspect or with reference to the eighth possible implementation manner of the first aspect, in a ninth possible implementation manner, the timing duration of the uplink signal control timer is shorter than timing duration of a time alignment timer of the user equipment.

With reference to the first aspect, in a tenth possible implementation manner, the first timer is a discontinuous reception inactivity timer; the method further includes: receiving timing durations, sent by the base station, of the discontinuous reception inactivity timer and a discontinuous reception short cycle timer of the user equipment; starting the discontinuous reception short cycle timer when the discontinuous reception inactivity timer expires, and sending the uplink signal to the base station according to the uplink signal configuration information before the discontinuous reception short cycle timer expires; and restarting the discontinuous reception short cycle timer when the restarted discontinuous reception inactivity timer expires, and sending the uplink signal to the base station according to a timing advance value of the user equipment and the uplink signal configuration information before the restarted discontinuous reception short cycle timer expires; and the stopping sending an uplink signal to the base station when the first timer expires includes: stopping sending the uplink signal to the base station when the discontinuous reception inactivity timer expires and the discontinuous reception short cycle timer expires.

With reference to the tenth possible implementation manner of the first aspect, in an eleventh possible implementation manner, the stopping sending the uplink signal to the base station when the discontinuous reception inactivity timer expires and the discontinuous reception short cycle timer expires includes: stopping sending the uplink signal to the base station when the discontinuous reception inactivity timer expires and the discontinuous reception short cycle timer expires and when on/off instruction information sent by the base station is received, where the on/off instruction information is used to instruct the user equipment to stop, when the discontinuous reception inactivity timer expires and the discontinuous reception short cycle timer expires, sending the uplink signal.

With reference to the tenth possible implementation manner of the first aspect or with reference to the eleventh possible implementation manner of the first aspect, in a twelfth possible implementation manner, the timing duration of the discontinuous reception inactivity timer and the timing duration of the discontinuous reception short cycle timer are shorter than timing duration of a time alignment timer of the user equipment.

According to a second aspect, an embodiment of the present invention provides a method for controlling uplink signal transmission, and the method includes: sending uplink signal configuration information to a user equipment; receiving an uplink signal that is sent by the user equipment according to the uplink signal configuration information before a first timer expires; sending trigger information to the user equipment after the first timer expires, where the trigger information is used to trigger the user equipment to restart the first timer; and receiving an uplink signal that is sent by the user equipment before the restarted first timer expires.

With reference to the second aspect, in a first possible implementation manner, the first timer is a time alignment timer TAT; the method further includes: sending first instruction information to the user equipment, where the first instruction information is used to instruct the user equipment to send, according to the uplink signal configuration information and before the restarted time alignment timer expires, the uplink signal; and the receiving an uplink signal that is sent by the user equipment before the restarted first timer expires includes: receiving the uplink signal that is sent by the user equipment according to a timing advance value of the user equipment and the first instruction information before the restarted time alignment timer expires.

With reference to the second aspect, in a second possible implementation manner, the first timer is a time alignment timer TAT; the method further includes: sending uplink signal reconfiguration information to the user equipment; and the receiving an uplink signal that is sent by the user equipment before the restarted first timer expires includes: receiving the uplink signal that is sent by the user equipment according to a timing advance value of the user equipment and the uplink signal reconfiguration information before the restarted time alignment timer expires.

With reference to the first possible implementation manner of the second aspect or with reference to the second possible implementation manner of the second aspect, in a third possible implementation manner, the method further includes: sending second instruction information and scheduling request configuration information to the user equipment, where the second instruction information is used to instruct the user equipment to send, when uplink data arrives, a scheduling request to the base station; and receiving a scheduling request that is sent by the user equipment according to the second instruction information and the scheduling request configuration information; and the sending trigger information to the user equipment includes: sending the trigger information to the user equipment according to the scheduling request.

With reference to the second aspect or with reference to any possible implementation manner of the first to third possible implementation manners of the second aspect, in a fourth possible implementation manner, the trigger information is a physical downlink control channel PDCCH or a timing advance command TAC.

With reference to the second aspect, in a fifth possible implementation manner, the first timer is a time alignment timer TAT; the method further includes: sending first instruction information to the user equipment, where the first instruction information is used to instruct the user equipment to send, according to the uplink signal configuration information and before the restarted time alignment timer expires, the uplink signal; the sending trigger information to the user equipment includes: sending a timing advance command to the user equipment; and the receiving an uplink signal that is sent by the user equipment before the restarted first timer expires includes: receiving the uplink signal that is sent by the user equipment according to the timing advance command and the first instruction information before the restarted time alignment timer expires.

With reference to the fifth possible implementation manner of the second aspect, in a sixth possible implementation manner, the method further includes: receiving a random access request message sent by the user equipment; and the sending a timing advance command to the user equipment includes: sending a random access response message to the user equipment according to the random access request message, where the random access response message carries the timing advance command.

With reference to the second aspect, in a seventh possible implementation manner, the first timer is an uplink signal control timer, where the uplink signal control timer is used to control whether the user equipment sends the uplink signal to the base station; the method further includes: sending timing duration of the uplink signal control timer to the user equipment; and the receiving an uplink signal that is sent by the user equipment according to the timing advance command and the uplink signal configuration information before the restarted first timer expires includes: receiving the uplink signal that is sent by the user equipment according to a timing advance value of the user equipment and the uplink signal configuration information before the restarted uplink signal control timer expires.

With reference to the seventh possible implementation manner of the second aspect, in an eighth possible implementation manner, the method further includes: sending scheduling request configuration information to the user equipment; and receiving a scheduling request that is sent by the user equipment according to the scheduling request configuration information; and the sending trigger information to the user equipment includes: sending the trigger information to the user equipment according to the scheduling request.

With reference to the seventh possible implementation manner of the second aspect or with reference to the eighth possible implementation manner of the second aspect, in a ninth possible implementation manner, the timing duration of the uplink signal control timer is shorter than timing duration of a time alignment timer of the user equipment.

With reference to the second aspect, in a tenth possible implementation manner, the first timer is a discontinuous reception inactivity timer; and the method further includes: sending timing durations of the discontinuous reception inactivity timer and a discontinuous reception short cycle timer of the user equipment to the user equipment; receiving the uplink signal that is sent by the user equipment according to the uplink signal configuration information when the discontinuous reception inactivity timer expires and before the discontinuous reception short cycle timer expires; and receiving the uplink signal that is sent by the user equipment according to a timing advance value of the user equipment and the uplink signal configuration information when the restarted discontinuous reception inactivity timer expires and before the restarted discontinuous reception short cycle timer expires.

With reference to the tenth possible implementation manner of the second aspect, in an eleventh possible implementation manner, the method further includes: sending on/off instruction information to the user equipment, where the on/off instruction information is used to instruct the user equipment to stop, when the discontinuous reception inactivity timer expires and the discontinuous reception short cycle timer expires, sending the uplink signal.

With reference to the tenth possible implementation manner of the second aspect or with reference to the eleventh possible implementation manner of the second aspect, in a twelfth possible implementation manner, the timing duration of the discontinuous reception inactivity timer and the timing duration of the discontinuous reception short cycle timer are shorter than timing duration of a time alignment timer of the user equipment.

According to a third aspect, an embodiment of the present invention provides a user equipment, and the user equipment includes: a first receiving module, configured to receive uplink signal configuration information sent by a base station; a sending module, configured to: send an uplink signal to the base station before a first timer expires and according to the uplink signal configuration information received by the first receiving module, and stop sending an uplink signal to the base station when the first timer expires; a second receiving module, configured to receive trigger information sent by the base station; and a timing module, configured to: restart the first timer according to the trigger information received by the second receiving module, and turn off the first timer when the first timer expires; where the sending module is further configured to send an uplink signal to the base station before the first timer restarted by the timing module expires.

With reference to the third aspect, in a first possible implementation manner, the first timer is a time alignment timer TAT; the first receiving module is further configured to receive first instruction information sent by the base station, where the first instruction information is used to instruct the user equipment to send, according to the uplink signal configuration information and before the time alignment timer restarted by the timing module expires, the uplink signal to the base station; and the sending module is specifically configured to: before the time alignment timer restarted by the timing module expires, send the uplink signal to the base station according to a timing advance value of the user equipment and the first instruction information received by the first receiving module.

With reference to the third aspect, in a second possible implementation manner, the first timer is a time alignment timer TAT; and the user equipment further includes: a releasing module, configured to release the uplink signal configuration information when the time alignment timer expires; where the first receiving module is further configured to receive uplink signal reconfiguration information sent by the base station; and the sending module is specifically configured to: before the time alignment timer restarted by the timing module expires, send the uplink signal to the base station according to a timing advance value of the user equipment and the uplink signal reconfiguration information received by the first receiving module.

With reference to the first possible implementation manner of the third aspect or with reference to the second possible implementation manner of the third aspect, in a third possible implementation manner, the first receiving module is further configured to receive second instruction information and scheduling request configuration information that are sent by the base station, where the second instruction information is used to instruct the user equipment to send, when uplink data arrives, a scheduling request to the base station; the sending module is further configured to: when uplink data arrives, send a scheduling request to the base station according to the second instruction information and the scheduling request configuration information that are received by the first receiving module; and the second receiving module is specifically configured to receive the trigger information sent by the base station according to the scheduling request.

With reference to the third aspect or with reference to any possible implementation manner of the first to third possible implementation manners of the third aspect, in a fourth possible implementation manner, the trigger information is a physical downlink control channel PDCCH or a timing advance command TAC.

With reference to the third aspect, in a fifth possible implementation manner, the first timer is a time alignment timer TAT; the first receiving module is further configured to receive first instruction information sent by the base station, where the first instruction information is used to instruct the user equipment to send, according to the uplink signal configuration information and before the restarted time alignment timer expires, the uplink signal to the base station; the second receiving module is specifically configured to receive a timing advance command sent by the base station; and the sending module is specifically configured to: before the time alignment timer restarted by the timing module expires, send the uplink signal to the base station according to the timing advance command received by the second receiving module and the first instruction information received by the first receiving module.

With reference to the fifth possible implementation manner of the third aspect, in a sixth possible implementation manner, the sending module is further configured to send a random access request message to the base station when the time alignment timer expires and uplink data arrives; and the second receiving module is specifically configured to receive a random access response message sent by the base station according to the random access request message, where the random access response message carries the timing advance command.

With reference to the third aspect, in a seventh possible implementation manner, the first timer is an uplink signal control timer, where the uplink signal control timer is used to control whether the user equipment sends the uplink signal to the base station; the first receiving module is specifically configured to receive timing duration of the uplink signal control timer sent by the base station; and the sending module is specifically configured to send the uplink signal to the base station according to a timing advance value of the user equipment and the uplink signal configuration information before the uplink signal control timer restarted by the timing module expires.

With reference to the seventh possible implementation manner of the third aspect, in an eighth possible implementation manner, the first receiving module is further configured to receive scheduling request configuration information sent by the base station; the sending module is further configured to: when uplink data arrives, send a scheduling request to the base station according to the scheduling request configuration information received by the first receiving module; and the second receiving module is specifically configured to receive the trigger information sent by the base station according to the scheduling request.

With reference to the seventh possible implementation manner of the third aspect or with reference to the eighth possible implementation manner of the third aspect, in a ninth possible implementation manner, the timing duration of the uplink signal control timer is shorter than timing duration of a time alignment timer of the user equipment.

With reference to the third aspect, in a tenth possible implementation manner, the first timer is a discontinuous reception inactivity timer; the first receiving module is further configured to receive timing durations, sent by the base station, of the discontinuous reception inactivity timer and a discontinuous reception short cycle timer of the user equipment; the timing module is further configured to: start the discontinuous reception short cycle timer when the discontinuous reception inactivity timer expires, and restart the discontinuous reception short cycle timer when the restarted discontinuous reception inactivity timer expires; and the sending module is further configured to: send the uplink signal to the base station according to the uplink signal configuration information before the discontinuous reception short cycle timer expires, and send the uplink signal to the base station according to a timing advance value of the user equipment and the uplink signal configuration information before the restarted discontinuous reception short cycle timer expires.

With reference to the tenth possible implementation manner of the third aspect, in an eleventh possible implementation manner, the first receiving module is further configured to receive on/off instruction information sent by the base station, where the on/off instruction information is used to instruct the user equipment to stop, when the discontinuous reception inactivity timer expires and the discontinuous reception short cycle timer expires, sending the uplink signal; and the sending module is specifically configured to: when the discontinuous reception inactivity timer expires and the discontinuous reception short cycle timer expires, and when the first receiving module receives the on/off instruction information sent by the base station, stop sending the uplink signal to the base station.

With reference to the tenth possible implementation manner of the third aspect or with reference to the eleventh possible implementation manner of the third aspect, in a twelfth possible implementation manner, the timing duration of the discontinuous reception inactivity timer and the timing duration of the discontinuous reception short cycle timer are shorter than timing duration of a time alignment timer of the user equipment.

According to a fourth aspect, an embodiment of the present invention provides a base station, and the base station includes: a first sending module, configured to send uplink signal configuration information to a user equipment; a receiving module, configured to receive an uplink signal that is sent by the user equipment before a first timer expires and according to the uplink signal configuration information sent by the first sending module; and a second sending module, configured to send trigger information to the user equipment after the first timer expires, where the trigger information is used to trigger the user equipment to restart the first timer; where the receiving module is further configured to receive an uplink signal that is sent by the user equipment before the restarted first timer expires.

With reference to the fourth aspect, in a first possible implementation manner, the first timer is a time alignment timer TAT; the first sending module is further configured to send first instruction information to the user equipment, where the first instruction information is used to instruct the user equipment to send, according to the uplink signal configuration information and before the restarted time alignment timer expires, the uplink signal; and the receiving module is specifically configured to receive the uplink signal that is sent by the user equipment before the restarted time alignment timer expires and according to a timing advance value of the user equipment and the first instruction information sent by the first sending module.

With reference to the fourth aspect, in a second possible implementation manner, the first timer is a time alignment timer TAT; the first sending module is further configured to send uplink signal reconfiguration information to the user equipment; and the receiving module is specifically configured to receive the uplink signal that is sent by the user equipment before the restarted time alignment timer expires and according to a timing advance value of the user equipment and the uplink signal reconfiguration information sent by the first sending module.

With reference to the first possible implementation manner of the fourth aspect or with reference to the second possible implementation manner of the fourth aspect, in a third possible implementation manner, the first sending module is further configured to send second instruction information and scheduling request configuration information to the user equipment, where the second instruction information is used to instruct the user equipment to send, when uplink data arrives, a scheduling request to the base station; the receiving module is further configured to receive a scheduling request that is sent by the user equipment according to the second instruction information and the scheduling request configuration information that are sent by the first sending module; and the second sending module is specifically configured to send the trigger information to the user equipment according to the scheduling request received by the second receiving module.

With reference to the fourth aspect or with reference to any possible implementation manner of the first to third possible implementation manners of the fourth aspect, in a fourth possible implementation manner, the trigger information is a physical downlink control channel PDCCH or a timing advance command TAC.

With reference to the fourth aspect, in a fifth possible implementation manner, the first timer is a time alignment timer TAT; the first sending module is further configured to send first instruction information to the user equipment, where the first instruction information is used to instruct the user equipment to send, according to the uplink signal configuration information and before the restarted time alignment timer expires, the uplink signal; the second sending module is specifically configured to send a timing advance command to the user equipment; and the receiving module is specifically configured to receive the uplink signal that is sent by the user equipment before the restarted time alignment timer expires and according to the timing advance command sent by the second sending module and the first instruction information sent by the first sending module.

With reference to the fifth possible implementation manner of the fourth aspect, in a sixth possible implementation manner, the receiving module is further configured to receive a random access request message sent by the user equipment; where the second sending module is specifically configured to send a random access response message to the user equipment according to the random access request message, where the random access response message carries the timing advance command.

With reference to the fourth aspect, in a seventh possible implementation manner, the first timer is an uplink signal control timer, where the uplink signal control timer is used to control whether the user equipment sends the uplink signal to the base station; the first sending module is further configured to send timing duration of the uplink signal control timer to the user equipment; and the receiving module is specifically configured to receive the uplink signal that is sent by the user equipment according to a timing advance value of the user equipment and the uplink signal configuration information before the restarted uplink signal control timer expires.

With reference to the seventh possible implementation manner of the fourth aspect, in an eighth possible implementation manner, the first sending module is further configured to send scheduling request configuration information to the user equipment; the receiving module is further configured to receive a scheduling request that is sent by the user equipment according to the scheduling request configuration information; and the second sending module is specifically configured to send the trigger information to the user equipment according to the scheduling request received by the receiving module.

With reference to the seventh possible implementation manner of the fourth aspect or with reference to the eighth possible implementation manner of the fourth aspect, in a ninth possible implementation manner, the timing duration of the uplink signal control timer is shorter than timing duration of a time alignment timer of the user equipment.

With reference to the fourth aspect, in a tenth possible implementation manner, the first timer is a discontinuous reception inactivity timer; the first sending module is further configured to send timing durations of the discontinuous reception inactivity timer and a discontinuous reception short cycle timer of the user equipment to the user equipment; and the receiving module is further configured to: receive the uplink signal that is sent by the user equipment according to the uplink signal configuration information when the discontinuous reception inactivity timer expires and before the discontinuous reception short cycle timer expires, and receive the uplink signal that is sent by the user equipment according to a timing advance value of the user equipment and the uplink signal configuration information when the restarted discontinuous reception inactivity timer expires and before the restarted discontinuous reception short cycle timer expires.

With reference to the tenth possible implementation manner of the fourth aspect, in an eleventh possible implementation manner, the first sending module is further configured to send on/off instruction information to the user equipment, where the on/off instruction information is used to instruct the user equipment to stop, when the discontinuous reception inactivity timer expires and the discontinuous reception short cycle timer expires, sending the uplink signal.

With reference to the tenth possible implementation manner of the fourth aspect or with reference to the eleventh possible implementation manner of the fourth aspect, in a twelfth possible implementation manner, the timing duration of the discontinuous reception inactivity timer and the timing duration of the discontinuous reception short cycle timer are shorter than timing duration of a time alignment timer of the user equipment.

Based on the foregoing technical solutions, according to the method for controlling uplink signal transmission, the user equipment, and the base station in the embodiments of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

BRIEF DESCRIPTION OF THE DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), a Worldwide Interoperability for Microwave Access ("Wi-MAX" for short) communications system and the like.

It should also be understood that in the embodiments of the present invention, a user equipment ("UE" for short) may be referred to as a terminal, a mobile station ("MS" for short), a mobile terminal, or the like. The user equipment may communicate with one or more core networks through a radio access network ("RAN" for short). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should further be understood that, in the embodiments of the present invention, the base station may be a base station (Base Transceiver Station, "BTS" for short) in the GSM or the CDMA, may be a base station (NodeB) in the WCDMA, or may further be an evolved NodeB (evolved Node B, "eNB" or "e-NodeB" for short) in the LTE. In addition, the base station may be an access point ("AP" for short) in WiFi, may be a user equipment that has a network device function, or may further be another name of an access network, for example, an evolved universal terrestrial radio access network (Evolved Universal Terrestrial Radio Access Network, "E-UTRAN" for short), and a universal terrestrial radio access network (Universal Terrestrial Radio Access Network, "UTRAN" for short). The present invention constitutes no limitation on this.

Figure 1:
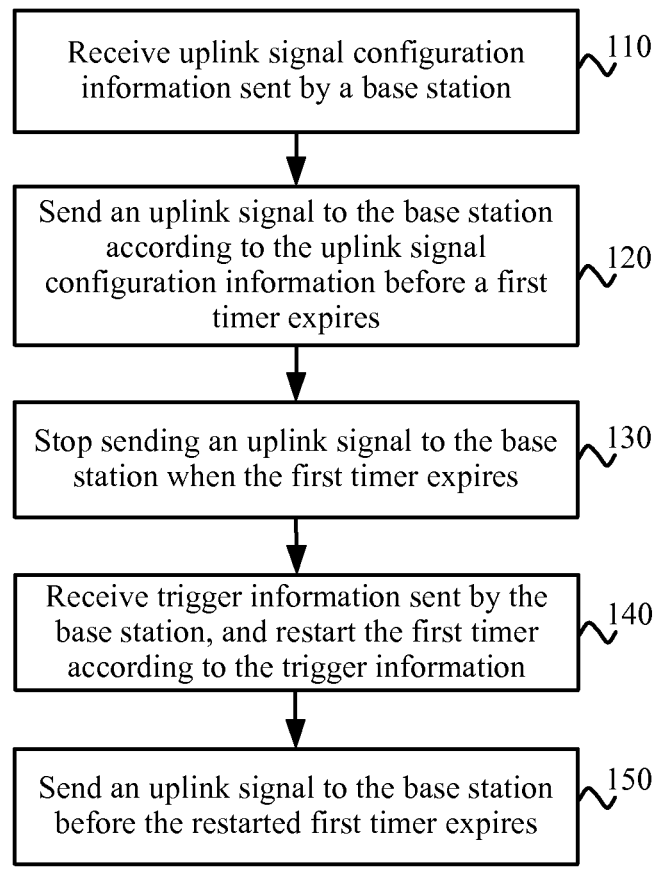
FIG. 1 is a schematic flowchart of a method for controlling uplink signal transmission according to an embodiment of the present invention.

FIG. 1 is a schematic flowchart of a method 100 for controlling uplink signal transmission according to an embodiment of the present invention. The method may be executed by a user equipment. As shown in FIG. 1, the method 100 includes the following steps.

S110. Receive uplink signal configuration information sent by a base station.

S120. Send an uplink signal to the base station according to the uplink signal configuration information before a first timer expires.

S130. Stop sending an uplink signal to the base station when the first timer expires.

S140. Receive trigger information sent by the base station, and restart the first timer according to the trigger information.

S150. Send an uplink signal to the base station before the restarted first timer expires.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

S110. The user equipment receives uplink signal configuration information sent by a base station.

The uplink signal may include at least one of an SRS and a CQI. Correspondingly, the uplink signal configuration information may include at least one type of the following configuration information: SRS configuration and CQI reporting configuration; however, this embodiment of the present invention is not limited thereto.

S140. The user equipment receives trigger information sent by the base station.

The trigger information is used to trigger the user equipment to restart the first timer. The trigger information may be any information sent by the base station. Optionally, the trigger information may also be a physical downlink control channel (Physical Downlink Control Channel, "PDCCH" for short); as the trigger information, the PDCCH also includes one downlink resource assignment or one uplink resource grant, so as to facilitate transmission of uplink and downlink data of the user equipment. Optionally, the trigger information may also be a TAC command; as the trigger information, the TAC command may also help the user equipment adjust a TA value. However, this embodiment of the present invention is not limited thereto. In addition, the base station may send the trigger information to the user equipment when receiving a random access request or a scheduling request from the user equipment, or the base station may actively send, when downlink data arrives, the trigger information to the user equipment, so as to trigger the user equipment to restart the first timer, which is not limited in this embodiment of the present invention.

Figure 2:
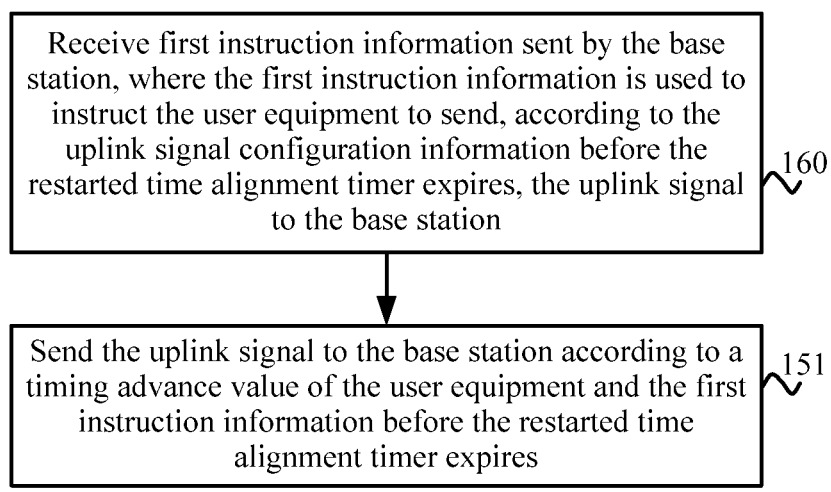
FIG. 2 is a schematic flowchart of a method for controlling uplink signal transmission according to another embodiment of the present invention.

Optionally, in this embodiment of the present invention, the first timer may be a time alignment timer TAT. When there are few cell users, the user equipment may not release uplink resource configuration when the TAT expires, and use, after the TAT is restarted, the uplink resource configuration available before the TAT expires to send the uplink signal, so as to prevent reconfiguration of an uplink resource. In addition, in a case in which a timing advance TA value of the user equipment remains unchanged all the time, for example, a cell is relatively small or the user equipment is still for a long time, the user equipment does not need to initiate a random access procedure to obtain its timing advance value, and only needs to send a scheduling request to the base station to obtain uplink and downlink resources. Therefore, optionally, as shown in FIG. 2, the method 100 further includes:

S160. Receive first instruction information sent by the base station, where the first instruction information is used to instruct the user equipment to send, according to the uplink signal configuration information and before the restarted time alignment timer expires, the uplink signal to the base station.

The S150 of sending an uplink signal to the base station before the restarted first timer expires includes the following steps.

S151. Send the uplink signal to the base station according to a timing advance value of the user equipment and the first instruction information before the restarted time alignment timer expires.

In this embodiment, because the user equipment does not release the uplink signal configuration information after the TAT expires and the TA value of the user equipment remains unchanged, the user equipment may send, after the TAT is restarted, the uplink signal according to the uplink signal configuration information available before the TAT expires and the TA value of the user equipment. It should be understood that, in this embodiment, "the TA value of the user equipment remains unchanged" means that the TA value of the user equipment does not change much, and the TA should not be limited to a fixed value; this embodiment of the present invention is not limited thereto.

Optionally, in this embodiment, to enable the base station to schedule the uplink and downlink resources more flexibly and to improve resource utilization, the user equipment may further determine, at the same time when receiving the trigger information, whether configuration valid indication information sent by the base station is received, so as to determine whether to send the uplink signal by using the uplink signal configuration information previously received by the user equipment. Specifically, when the user equipment receives the configuration valid indication information, it indicates that the previously received uplink signal configuration information is still valid; otherwise, it indicates that the previous uplink signal configuration information is invalid, and in this case, the user equipment releases the previous uplink signal configuration, receives uplink signal reconfiguration information sent by the base station, and sends the uplink signal according to the uplink signal reconfiguration information. Optionally, the user equipment may also receive the configuration valid indication information in both cases, and determine, according to an indication of the configuration valid indication information, whether the previous uplink signal configuration is valid. For example, when the configuration valid indication information carries a "YES" field, it is determined that the previous uplink signal configuration information is valid; when the configuration valid indication information carries a "NO" field, it is determined that the previous uplink signal configuration information is invalid. Optionally, a "TRUE" or "FALSE" field may be carried in the configuration valid indication information to indicate that the uplink signal configuration information is valid or invalid. This embodiment of the present invention is not limited thereto. Optionally, the base station may add both the configuration valid indication information and the trigger information to one message and send the message to the user equipment, or may separately send the two pieces of information to the user equipment, which is not limited in this embodiment of the present invention.

Figure 3:
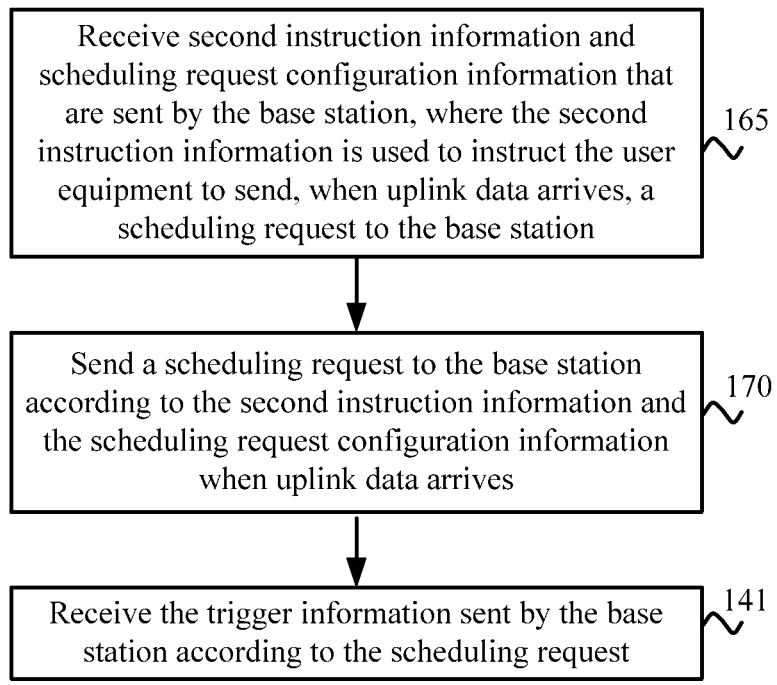
FIG. 3 is a schematic flowchart of a method for controlling uplink signal transmission according to still another embodiment of the present invention.

Optionally, when uplink data arrives, that is, there is uplink data that needs to be transmitted, the user equipment may directly send the scheduling request to the base station without performing a random access procedure, so as to reduce control signaling and speed up sending of the uplink data. Therefore, optionally, in another embodiment, as shown in FIG. 3, the method 100 further includes:

S165. Receive second instruction information and scheduling request configuration information that are sent by the base station, where the second instruction information is used to instruct the user equipment to send, when uplink data arrives, a scheduling request to the base station.

S170. Send a scheduling request to the base station according to the second instruction information and the scheduling request configuration information when uplink data arrives.

The S140 of receiving trigger information sent by the base station includes:

S141. Receive the trigger information sent by the base station according to the scheduling request.

In S165, the scheduling request configuration information may indicate configuration information such as a time-frequency resource used by the user equipment to send the scheduling request. Optionally, the base station may add the second instruction information and the scheduling request configuration information to one message and send the message to the user equipment, or may separately send the second instruction information and the scheduling request configuration information to the user equipment. Correspondingly, the user equipment may receive one indication message, where the indication message carries the second instruction information and the scheduling request configuration information, or may separately receive the two pieces of information, that is, the second instruction information and the scheduling request configuration information. Similarly, the base station may add the second instruction information and the first instruction information to one message and send the message to the user equipment, or may separately send the two messages to the user equipment. Optionally, the second instruction information and the first instruction information may be combined into a single piece of instruction information, where a function of the single piece of instruction information is the sum of a function of the second instruction information and a function of the first instruction information. This embodiment of the present invention is not limited thereto.

In S141, the trigger information may be a PDCCH, or may be a TAC command, which is not limited in this embodiment of the present invention. In addition, when the trigger information is a TAC command, because the TA value of the user equipment remains unchanged all the time, a TA value indicated by the TAC command is the same as the previous TA value of the user equipment.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 4:
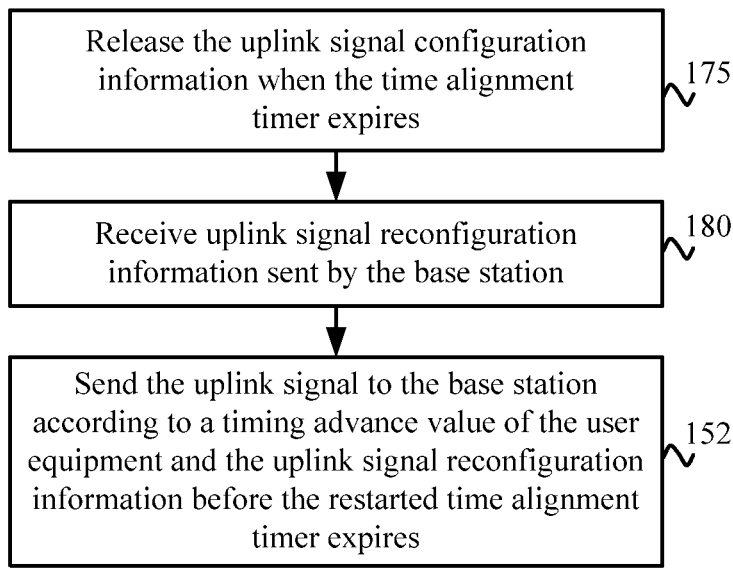
FIG. 4 is a schematic flowchart of a method for controlling uplink signal transmission according to still another embodiment of the present invention.

When the first timer is a time alignment timer TAT, optionally, when a TA value of the user equipment remains unchanged, the user equipment may also not perform the random access procedure, but releases the uplink signal configuration when the TAT expires, so as to facilitate effective utilization of the uplink and downlink resources. Therefore, optionally, in another embodiment, as shown in FIG. 4, the method 100 further includes the following steps.

S175. Release the uplink signal configuration information when the time alignment timer expires.

S180. Receive uplink signal reconfiguration information sent by the base station.

The S150 of sending an uplink signal to the base station before the restarted first timer expires includes:

S152. Send the uplink signal to the base station according to a timing advance value of the user equipment and the uplink signal reconfiguration information before the restarted time alignment timer expires.

In this embodiment, the user equipment may receive, at the same time when receiving the trigger information sent by the base station, the uplink signal reconfiguration information sent by the base station, or may receive, after receiving the trigger information sent by the base station, the uplink signal reconfiguration information sent by the base station, which is not limited in this embodiment of the present invention. Correspondingly, a sequence of two operations of receiving, by the user equipment, the uplink signal reconfiguration information sent by the base station and restarting, by the user equipment, the TAT is not limited in this embodiment; however, the user equipment sends the uplink signal to the base station only after receiving the uplink signal reconfiguration information and restarting the TAT. In addition, it should also be understood that "the TA value remains unchanged" in this embodiment means that the TA value does not change much, and the TA should not be limited to a fixed value.

Optionally, when uplink data arrives, the user equipment may not perform the random access procedure; therefore, a process in which the user equipment restarts the TAT and sends the uplink signal is the same as the process shown in FIG. 3. That is, the user equipment receives second instruction information and scheduling request configuration information that are sent by the base station, where the second instruction information is used to instruct the user equipment to send, when uplink data arrives, a scheduling request to the base station; when uplink data arrives, the user equipment sends a scheduling request to the base station according to the second instruction information and the scheduling request configuration information; and finally, the user equipment receives the trigger information sent by the base station according to the scheduling request.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 5:
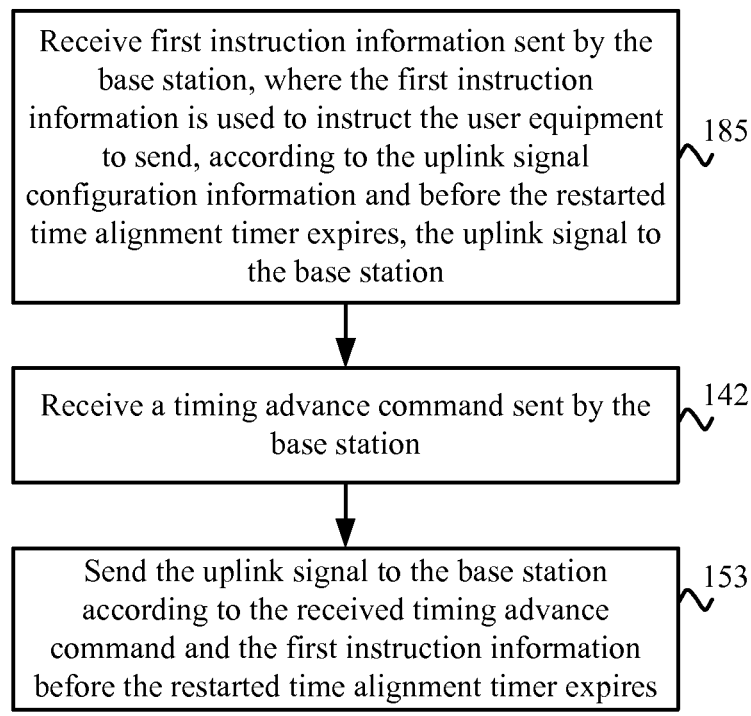
FIG. 5 is a schematic flowchart of a method for controlling uplink signal transmission according to still another embodiment of the present invention.

When the first timer is a time alignment timer TAT, optionally, when uplink and downlink transmission for the user equipment is frequent or there are few cell users, the user equipment may not release uplink and downlink resource configuration after the TAT expires, but the TA value of the user equipment may change significantly; therefore, a random access procedure may be initiated to acquire a new TA value. Therefore, optionally, as shown in FIG. 5, in another embodiment, the method 100 further includes the following steps.

S185. Receive first instruction information sent by the base station, where the first instruction information is used to instruct the user equipment to send, according to the uplink signal configuration information and before the restarted time alignment timer expires, the uplink signal to the base station.

The S140 of receiving trigger information sent by the base station includes:

S142. Receive a timing advance command sent by the base station.

The S150 of sending an uplink signal to the base station before the restarted first timer expires includes:

S153. Send the uplink signal to the base station according to the received timing advance command and the first instruction information before the restarted time alignment timer expires.

In this embodiment, because the TA of the user equipment may change significantly, the TA value of the user equipment available before the TAT expires is no longer applicable after the TAT expires and when there is uplink and downlink data that needs to be transmitted for the user equipment. In this case, the base station may send a TAC to the user equipment as the trigger information to trigger the user equipment to restart the TAT; meanwhile, the user equipment may obtain a current TA value according to the TAC, so as to perform uplink and downlink data transmission according to the received TA value; however, this embodiment of the present invention is not limited thereto.

Figure 6:
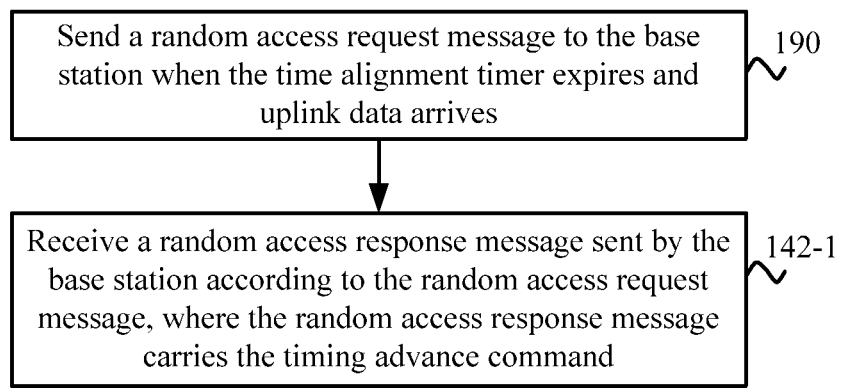
FIG. 6 is a schematic flowchart of a method for controlling uplink signal transmission according to still another embodiment of the present invention.

Optionally, when there is uplink data, the user equipment needs to actively initiate a random access procedure to obtain the TAC sent by the base station. Therefore, optionally, as shown in FIG. 6, the method 100 further includes the following steps.

S190. Send a random access request message to the base station when the time alignment timer expires and uplink data arrives.

The S142 of receiving a timing advance command sent by the base station includes:

S142-1. Receive a random access response message sent by the base station according to the random access request message, where the random access response message carries the timing advance command.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 7:
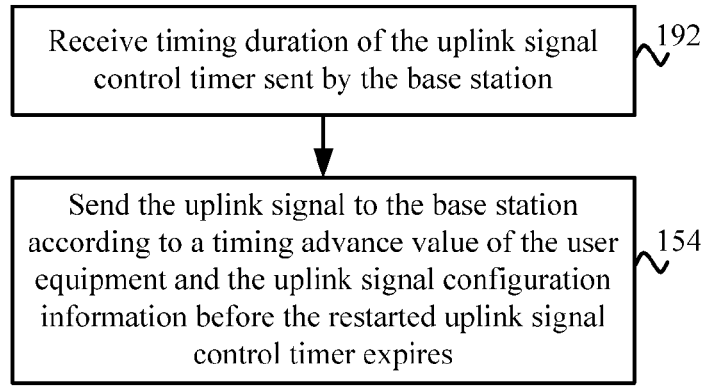
FIG. 7 is a schematic flowchart of a method for controlling uplink signal transmission according to still another embodiment of the present invention.

Optionally, in this embodiment of the present invention, a new timer may also be used to control transmission of the uplink signal. Optionally, the first timer may be an uplink signal control timer (Uplink Signal Control Timer, "USCT" for short), where the uplink signal control timer is used to control whether the user equipment sends the uplink signal to the base station. Therefore, optionally, in another embodiment, as shown in FIG. 7, the method 100 further includes the following steps.

S192. Receive timing duration of the uplink signal control timer sent by the base station.

The S150 of sending an uplink signal to the base station before the restarted first timer expires includes:

S154. Send the uplink signal to the base station according to a timing advance value of the user equipment and the uplink signal configuration information before the restarted uplink signal control timer expires.

In this embodiment, the USCT is used to control transmission of the uplink signal. Specifically, when the USCT is running, the user equipment sends the uplink signal to the base station; when the USCT is not running, the UE does not send the uplink signal to the base station. Optionally, running and no running of the USCT may also be used to control sending and no sending of the uplink signal. This embodiment of the present invention is not limited thereto. The USCT may be started when the trigger information from the base station is received, for example, the user equipment starts or restarts the USCT when receiving a PDCCH that is sent by the base station and that includes a downlink resource assignment or an uplink resource grant, or may start or restart the USCT when starting or restarting a TAT of the user equipment. The USCT stops running immediately after expiry, and in addition, when the TAT is not running, the user equipment considers that the USCT is not running. This embodiment of the present invention is not limited thereto.

In this embodiment, the timing duration of the uplink signal control timer USCT is shorter than timing duration of the time alignment timer TAT of the user equipment. Specifically, the timing duration of the TAT of the user equipment may be much longer than the timing duration of the USCT. Optionally, the timing duration of the TAT of the user equipment may also be infinitely long. Therefore, in this embodiment, the TAT of the user equipment remains in a started state all the time, and the user equipment keeps uplink synchronization with the base station all the time in a process of controlling transmission of the uplink signal in this embodiment, so that procedures of random access and uplink signal reconfiguration are not required, thereby reducing control signaling; the USCT is used to control transmission of the uplink signal, so that the user equipment sends uplink and downlink signals only when there is uplink and downlink data to be transmitted, thereby preventing transmission of a useless uplink signal and reducing power usage of the user equipment. In addition, another function of the TAT is the same as a function in the prior art, so that this embodiment of the present invention may be compatible with the prior art. However, this embodiment of the present invention is not limited thereto.

Optionally, when uplink data arrives, the method 100 further includes the following steps.

S193. Receive scheduling request configuration information sent by the base station.

S194. Send a scheduling request to the base station according to the scheduling request configuration information when uplink data arrives.

The S140 of receiving trigger information sent by the base station includes:

S143. Receive the trigger information sent by the base station according to the scheduling request.

It should be understood that the timer in this embodiment should be determined according to functions and internal logic of the timer, and the new timer may also use another name, which should not be construed as any limitation on the protection scope of the embodiments of the present invention.

In this embodiment, because the user equipment is in a connected state all the time, the user equipment may directly send the scheduling request to the base station when the uplink data arrives. Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 8:
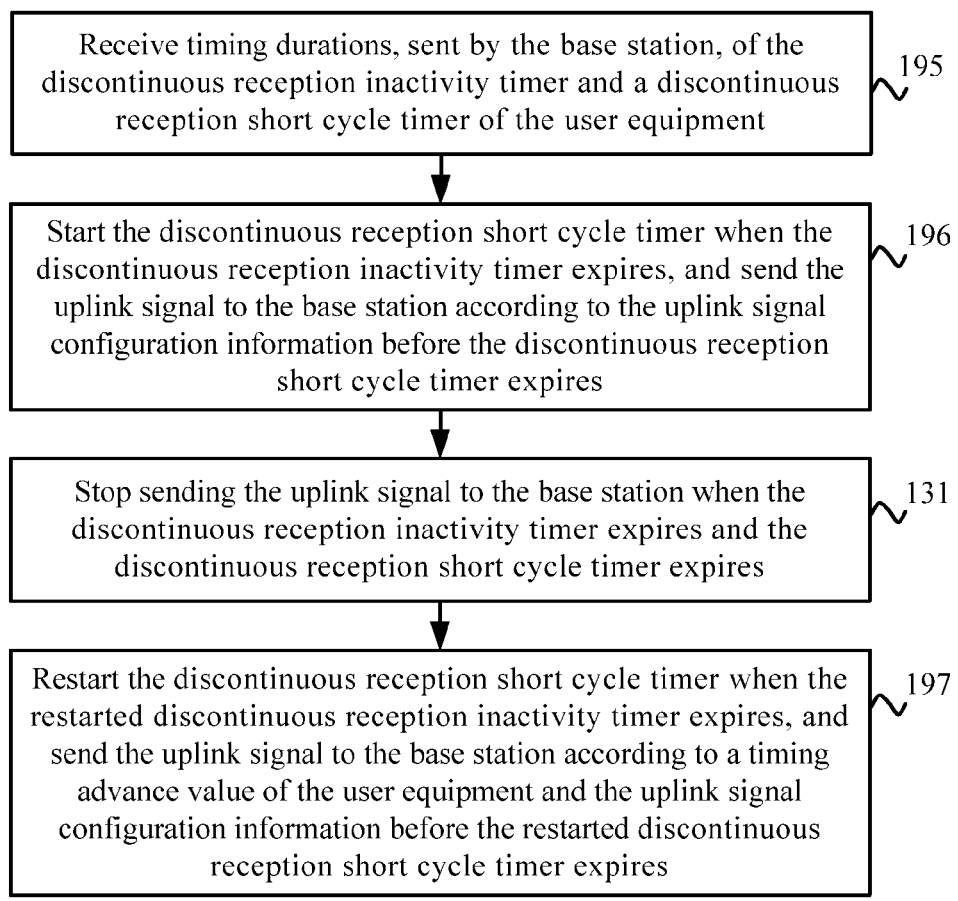
FIG. 8 is a schematic flowchart of a method for controlling uplink signal transmission according to still another embodiment of the present invention.

Optionally, in this embodiment of the present invention, the first timer may also be an existing discontinuous reception inactivity timer. Therefore, optionally, in another embodiment, as shown in FIG. 8, the method 100 further includes the following steps.

S195. Receive timing durations, sent by the base station, of the discontinuous reception inactivity timer and a discontinuous reception short cycle timer of the user equipment.

S196. Start the discontinuous reception short cycle timer when the discontinuous reception inactivity timer expires, and before the discontinuous reception short cycle timer expires, send the uplink signal to the base station according to the uplink signal configuration information.

S197. Restart the discontinuous reception short cycle timer when the restarted discontinuous reception inactivity timer expires, and before the restarted discontinuous reception short cycle timer expires, send the uplink signal to the base station according to a timing advance value of the user equipment and the uplink signal configuration information.

In the method 100, the S130 of stopping sending an uplink signal to the base station when the first timer expires includes:

S131. Stop sending the uplink signal to the base station when the discontinuous reception inactivity timer expires and the discontinuous reception short cycle timer expires.

Optionally, the trigger information may be a PDCCH that indicates new uplink or downlink transmission, which is not limited in this embodiment of the present invention. In this embodiment, the discontinuous reception inactivity timer drx-inactivityTimer and the discontinuous reception short cycle timer drx-shortCycleTimer jointly control transmission of the uplink signal. The user equipment sends the uplink signal to the base station after the drx-inactivityTimer is started, starts the drx-ShortCycleTimer after the drx-inactivityTimer expires, and sends the uplink signal all the time before the drx-ShortCycleTimer expires. After both the drx-inactivityTimer and the drx-ShortCycleTimer expire, the user equipment stops sending the uplink signal. Other functions of the two timers and the TAT are the same as those in the prior art; therefore, this embodiment may be well compatible with the prior art.

In this embodiment, the timing duration of the discontinuous reception inactivity timer drx-inactivityTimer and the timing duration of the discontinuous reception short cycle timer drx-ShortCycleTimer are shorter than timing duration of a time alignment timer TAT of the user equipment. Specifically, the timing duration of the TAT of the user equipment may be much longer than the timing durations of the drx-inactivityTimer and the drx-ShortCycleTimer of the user equipment. The timing duration of the TAT of the user equipment may also be infinitely long. Therefore, in this embodiment, the TAT remains in a started state all the time, and the user equipment keeps uplink synchronization with the base station all the time in the process; therefore, procedures of random access and uplink signal reconfiguration are not required, thereby reducing control signaling; the drx-inactivityTimer and the drx-ShortCycleTimer are used to control transmission of the uplink signal, so that the user equipment sends the uplink signal only when there is uplink and downlink data to be transmitted, thereby preventing transmission of a useless uplink signal and reducing power usage of the user equipment.

Optionally, in another embodiment, the S131 of stopping sending the uplink signal to the base station when the discontinuous reception inactivity timer expires and the discontinuous reception short cycle timer expires includes the following steps.

S131-1. Stop sending the uplink signal to the base station when the discontinuous reception inactivity timer expires and the discontinuous reception short cycle timer expires and when on/off instruction information sent by the base station is received, where the on/off instruction information is used to instruct the user equipment to stop, when the discontinuous reception inactivity timer expires and the discontinuous reception short cycle timer expires, sending the uplink signal.

The on/off instruction information is used to indicate whether the user equipment uses a function of the drx-inactivityTimer and the drx-ShortCycleTimer for controlling transmission of the uplink signal. Optionally, the on/off instruction information may be implicit or explicit. For example, if the user equipment receives the on/off instruction information, the user equipment uses the function, where the on/off instruction information may carry "SETUP" or "TRUE"; otherwise, if the user equipment does not receive the on/off instruction information, the user equipment uses the TAT in the prior art to control transmission of the uplink signal. Optionally, the user equipment may also receive the on/off instruction information in both cases of using the function and not using the function. If the on/off instruction information carries "TRUE", it indicates that the function is used; if the on/off instruction information carries "FALSE", it indicates that the function is not used. This embodiment of the present invention is not limited thereto.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

With reference to FIG. 1 to FIG. 8, the foregoing describes in detail the method for controlling uplink signal transmission according to the embodiments of the present invention from a perspective of a user equipment. With reference to FIG. 9 to FIG. 16, the following describes a method for controlling uplink signal transmission according to the embodiments of the present invention from a perspective of a base station.

Figure 9:
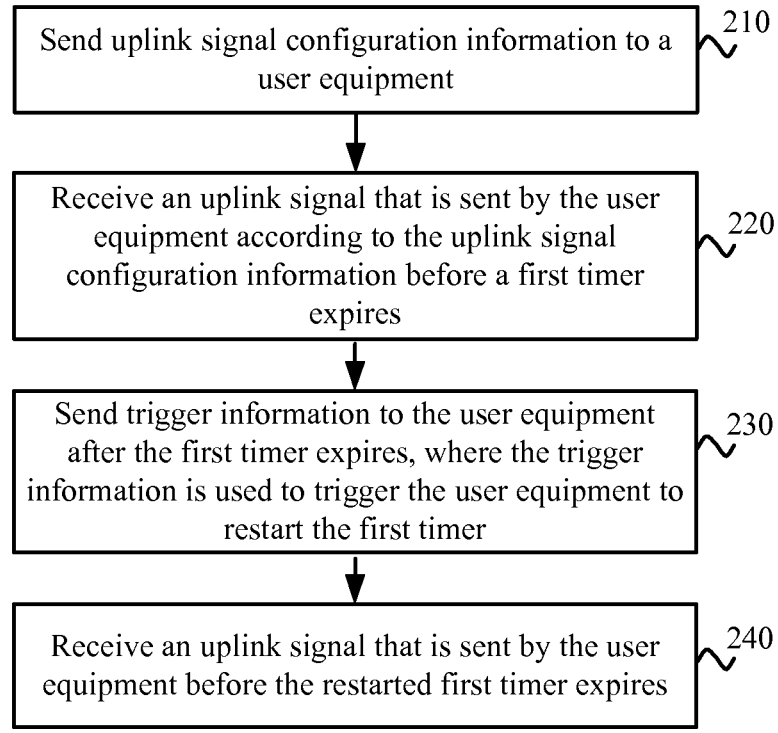
FIG. 9 is a schematic flowchart of a method for controlling uplink signal transmission according to still another embodiment of the present invention.

FIG. 9 is a schematic flowchart of a method 200 for controlling uplink signal transmission according to an embodiment of the present invention. The method is executed by a base station. As shown in FIG. 9, the method 200 includes the following steps.

S210. Send uplink signal configuration information to a user equipment.

S220. Receive an uplink signal that is sent by the user equipment according to the uplink signal configuration information before a first timer expires.

S230. Send trigger information to the user equipment after the first timer expires, where the trigger information is used to trigger the user equipment to restart the first timer.

S240. Receive an uplink signal that is sent by the user equipment before the restarted first timer expires.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

In S210, the uplink signal may include at least one of an SRS and a CQI. Correspondingly, the uplink signal configuration information may include at least one type of the following configuration information: SRS configuration and CQI reporting configuration. However, this embodiment of the present invention is not limited thereto.

In S230, the trigger information is used to trigger the user equipment to restart the first timer, where the trigger information may be any information sent by the base station, or the trigger information may be a PDCCH, and optionally, the trigger information may further be a TAC command, which is not limited in this embodiment of the present invention. In addition, the base station may send the trigger information to the user equipment when receiving a random access request or a scheduling request from the user equipment, or the base station may actively send, when downlink data arrives, the trigger information to the user equipment, so as to trigger the user equipment to restart the first timer, which is not limited in this embodiment of the present invention.

Figure 10:
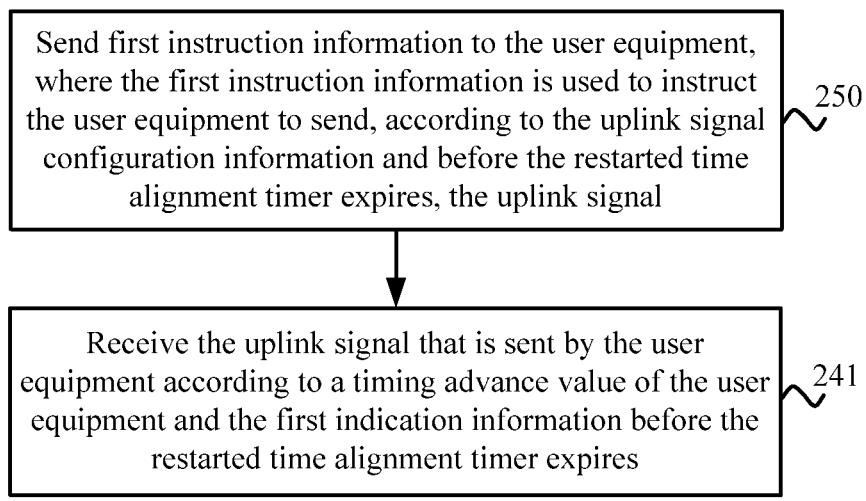
FIG. 10 is a schematic flowchart of a method for controlling uplink signal transmission according to still another embodiment of the present invention.

Optionally, in this embodiment of the present invention, the first timer may be a time alignment timer TAT. When there are few cell users, the user equipment may not release an uplink resource configuration when the TAT expires, and use, after the TAT is restarted, the uplink resource configuration available before the TAT expires to send the uplink signal, thereby avoiding that the base station reconfigures an uplink resource for the user equipment. In addition, in a case in which a timing advance TA value of the user equipment remains unchanged all the time, for example, a cell is relatively small or the user equipment is still for a long time, the user equipment does not need to initiate a random access procedure to obtain its timing advance value, and only needs to send a scheduling request to the base station to obtain uplink and downlink resources. Therefore, optionally, as shown in FIG. 10, the method 200 further includes:

S250. Send first instruction information to the user equipment, where the first instruction information is used to instruct the user equipment to send, according to the uplink signal configuration information and before the restarted time alignment timer expires, the uplink signal.

The S240 of receiving an uplink signal that is sent by the user equipment before the restarted first timer expires includes the following steps.

S241. Receive the uplink signal that is sent by the user equipment according to a timing advance value of the user equipment and the first instruction information before the restarted time alignment timer expires.

Optionally, in this embodiment, to schedule the uplink and downlink resources more flexibly and to improve resource utilization, the base station may determine whether to send, at the same time when sending the trigger information to the user equipment, configuration valid indication information to the user equipment to indicate whether the uplink signal configuration information previously received by the user equipment is valid. Specifically, the base station may send the configuration valid indication information to indicate that the uplink signal configuration information is valid, and does not send the configuration valid indication information to indicate that the uplink signal configuration information is invalid; or send the configuration valid indication information in both cases, and indicate, in the configuration valid indication information, whether the uplink signal configuration information is valid, which is not limited in this embodiment of the present invention. Optionally, the base station may add the configuration valid indication information and the trigger information to one message and send the message to the user equipment, or may separately send the configuration valid indication information and the trigger information as two pieces of information, which is not limited in this embodiment of the present invention.

Figure 11:
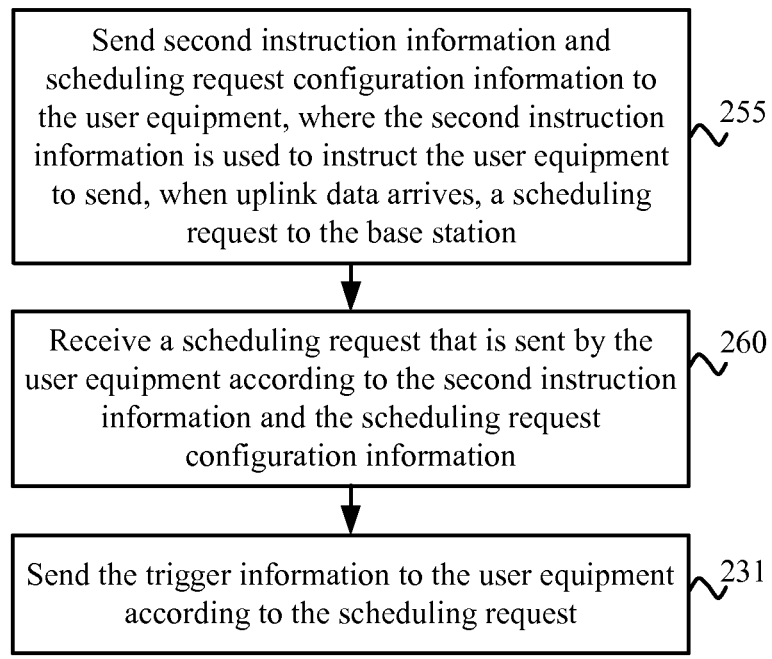
FIG. 11 is a schematic flowchart of a method for controlling uplink signal transmission according to still another embodiment of the present invention.

Optionally, when uplink data arrives, the user equipment does not need to initiate a random access procedure but directly sends a scheduling request to the base station to obtain uplink and downlink resources. Therefore, optionally, in another embodiment, as shown in FIG. 11, the method 200 further includes:

S255. Send second instruction information and scheduling request configuration information to the user equipment, where the second instruction information is used to instruct the user equipment to send, when uplink data arrives, a scheduling request to the base station.

S260. Receive a scheduling request that is sent by the user equipment according to the second instruction information and the scheduling request configuration information.

The S230 of sending trigger information to the user equipment includes:

S231. Send the trigger information to the user equipment according to the scheduling request.

In S255, the base station may separately send the second instruction information and the scheduling request configuration information as two pieces of information to the user equipment, or may add the second instruction information and the scheduling request configuration information to one message and send the message to the user equipment. Similarly, the base station may add the second instruction information and the first instruction information to one message and send the message to the user equipment, or may separately send the two pieces of information to the user equipment, which is not limited in this embodiment of the present invention.

In S231, the trigger information may be a PDCCH, may be a TAC command, or may be other information, which is not limited in this embodiment of the present invention.

Therefore, according to the method for controlling uplink signal transmission in this embodiment of the present invention, a random access procedure and sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 12:
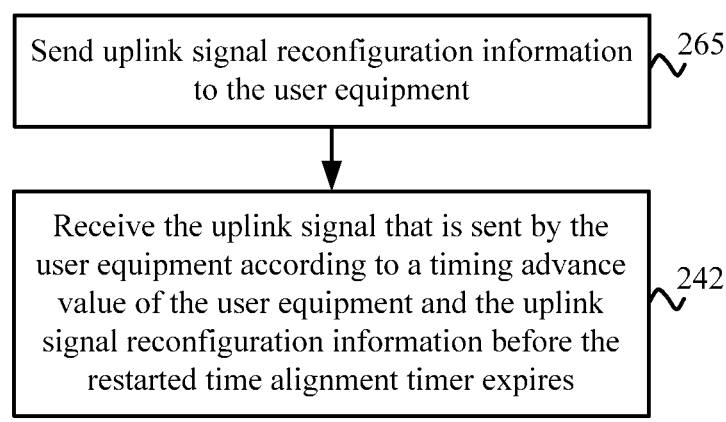
FIG. 12 is a schematic flowchart of a method for controlling uplink signal transmission according to still another embodiment of the present invention.

When the first timer is a time alignment timer TAT, optionally, when a TA value of the user equipment remains unchanged, and uplink and downlink service volumes of the user equipment are relatively low, the user equipment may also not perform the random access procedure, but releases the uplink signal configuration when the TAT expires, so as to facilitate effective utilization of the uplink and downlink resources. Therefore, optionally, in another embodiment, as shown in FIG. 12, the method 200 further includes:

S265. Send uplink signal reconfiguration information to the user equipment.

The S240 of receiving an uplink signal that is sent by the user equipment before the restarted first timer expires includes the following steps.

S242. Receive the uplink signal that is sent by the user equipment according to a timing advance value of the user equipment and the uplink signal reconfiguration information before the restarted time alignment timer expires.

In this embodiment, the base station may send, at the same time when sending the trigger information, the uplink signal reconfiguration information to the user equipment, or may send, after sending the trigger information, the uplink signal reconfiguration information to the user equipment, which is not limited in this embodiment of the present invention.

Optionally, when uplink data arrives, the user equipment may not perform the random access procedure; therefore, a process in which the base station restarts the TAT is the same as the process shown in FIG. 11, and for brevity, details are not described herein again.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 13:
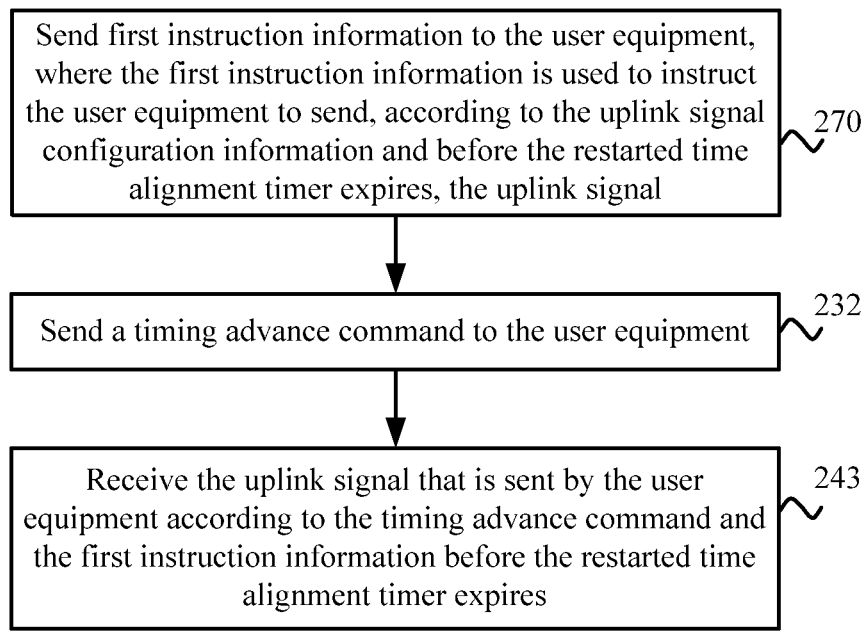
FIG. 13 is a schematic flowchart of a method for controlling uplink signal transmission according to still another embodiment of the present invention.

When the first timer is a time alignment timer TAT, optionally, when uplink and downlink transmission for the user equipment is frequent or there are few cell users, the user equipment may not release uplink and downlink resource configuration after the TAT expires, and a TA value of the user equipment may change; therefore, the user equipment may initiate a random access procedure to acquire a new TA value. Therefore, optionally, as shown in FIG. 13, in another embodiment, the method 200 further includes the following steps.

S270. Send first instruction information to the user equipment, where the first instruction information is used to instruct the user equipment to send, according to the uplink signal configuration information and before the restarted time alignment timer expires, the uplink signal.

The S230 of sending trigger information to the user equipment includes:

S232. Send a timing advance command to the user equipment.

The S240 of receiving an uplink signal that is sent by the user equipment before the restarted first timer expires includes:

S243. Receive the uplink signal that is sent by the user equipment according to the timing advance command and the first instruction information before the restarted time alignment timer expires.

In this embodiment, the base station may send a TAC to the user equipment as the trigger information to trigger the user equipment to restart the TAT; meanwhile, the user equipment may obtain a current TA value according to the TAC, so as to perform uplink and downlink data transmission; however, this embodiment of the present invention is not limited thereto.

Figure 14:
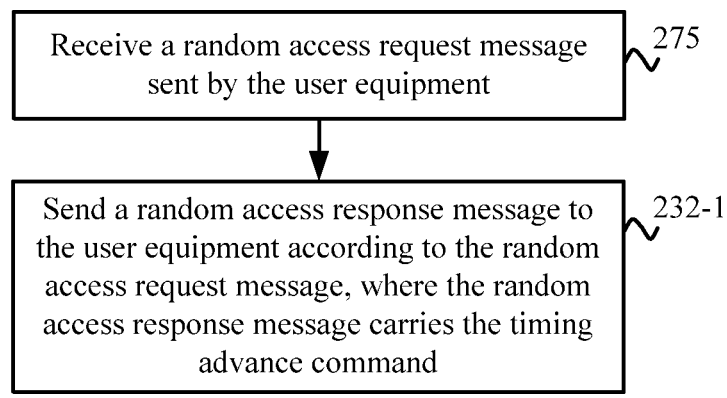
FIG. 14 is a schematic flowchart of a method for controlling uplink signal transmission according to still another embodiment of the present invention.

Optionally, when there is uplink data, the user equipment needs to actively initiate a random access procedure to obtain the TAC sent by the base station. Therefore, optionally, as shown in FIG. 14, the method 200 further includes the following steps.

S275. Receive a random access request message sent by the user equipment.

The S232 of sending a timing advance command to the user equipment includes:

S232-1. Send a random access response message to the user equipment according to the random access request message, where the random access response message carries the timing advance command.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 15:
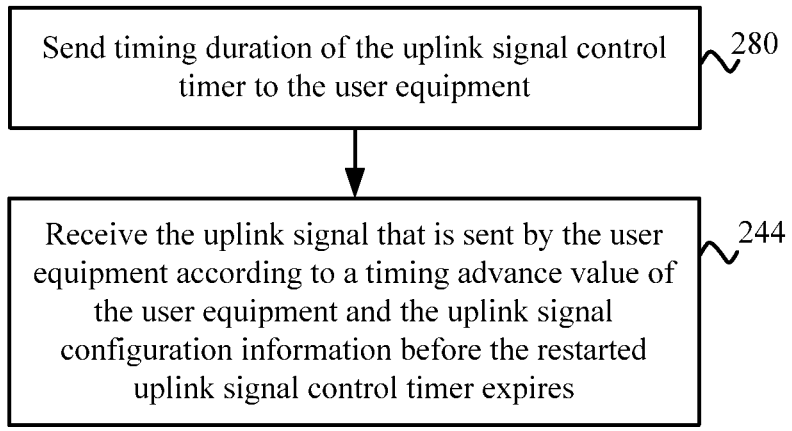
FIG. 15 is a schematic flowchart of a method for controlling uplink signal transmission according to still another embodiment of the present invention.

Optionally, in this embodiment of the present invention, the first timer may also be an uplink signal control timer USCT, where the uplink signal control timer is used to control whether the user equipment sends the uplink signal to the base station. Therefore, optionally, in another embodiment, as shown in FIG. 15, the method 200 further includes the following steps.

S280. Send timing duration of the uplink signal control timer to the user equipment.

The S240 of receiving an uplink signal that is sent by the user equipment according to the timing advance command and the uplink signal configuration information before the restarted first timer expires includes:

S244. Receive the uplink signal that is sent by the user equipment according to a timing advance value of the user equipment and the uplink signal configuration information before the restarted uplink signal control timer expires.

In this embodiment, the timing duration of the uplink signal control timer is shorter than timing duration of the time alignment timer of the user equipment.

Optionally, when uplink data arrives, the method 200 further includes:

S285. Send scheduling request configuration information to the user equipment.

S290. Receive a scheduling request that is sent by the user equipment according to the scheduling request configuration information.

The S230 of sending trigger information to the user equipment includes:

S233. Send the trigger information to the user equipment according to the scheduling request.

Optionally, the trigger information may be a PDCCH that indicates new uplink or downlink transmission, which is not limited in this embodiment of the present invention. In this embodiment, because the user equipment is in an uplink synchronization state all the time, the user equipment may directly send the scheduling request to the base station when the uplink data arrives. Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 16:
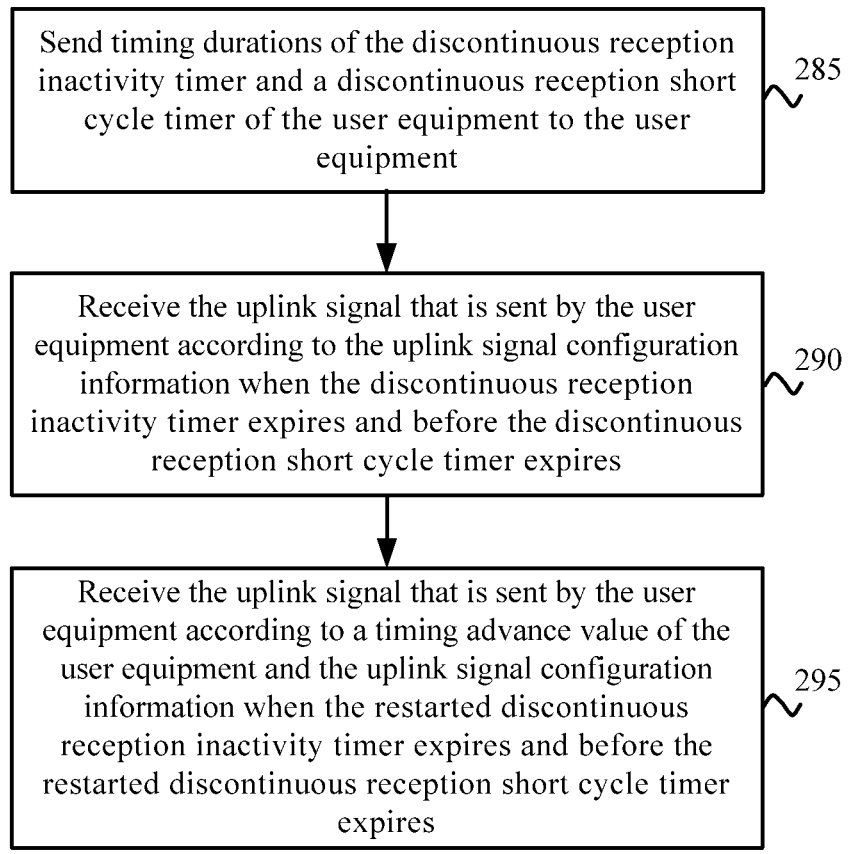
FIG. 16 is a schematic flowchart of a method for controlling uplink signal transmission according to still another embodiment of the present invention.

Optionally, in this embodiment of the present invention, the first timer may also be a discontinuous reception inactivity timer. Therefore, optionally, in another embodiment, as shown in FIG. 16, the method 200 further includes the following steps.

S285. Send timing durations of the discontinuous reception inactivity timer and a discontinuous reception short cycle timer of the user equipment to the user equipment.

S290. Receive the uplink signal that is sent by the user equipment according to the uplink signal configuration information when the discontinuous reception inactivity timer expires and before the discontinuous reception short cycle timer expires.

S295. Receive the uplink signal that is sent by the user equipment according to a timing advance value of the user equipment and the uplink signal configuration information when the restarted discontinuous reception inactivity timer expires and before the restarted discontinuous reception short cycle timer expires.

In this embodiment, the discontinuous reception inactivity timer and the discontinuous reception short cycle timer jointly control transmission of the uplink signal. The timing duration of the discontinuous reception inactivity timer and the timing duration of the discontinuous reception short cycle timer are shorter than timing duration of a time alignment timer of the user equipment.

Optionally, the base station may send on/off instruction information to the user equipment to instruct the user equipment whether to use the function of the drx-inactivityTimer and the drx-ShortCycleTimer for controlling transmission of the uplink signal. Therefore, optionally, in another embodiment, the method 200 further includes:

296. Send on/off instruction information to the user equipment, where the on/off instruction information is used to instruct the user equipment to stop, when the discontinuous reception inactivity timer expires and the discontinuous reception short cycle timer expires, sending the uplink signal.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

It should be understood that, in this embodiment of the present invention, interaction between a base station and a user equipment, and related features, functions, and the like described on a base station side are corresponding to descriptions on a user equipment side. For brevity, details are not described herein again.

The following describes this embodiment of the present invention in detail with reference to a specific example. It should be noted that, the example is merely intended to help a person skilled in the art better understand this embodiment of the present invention, instead of limiting the scope of this embodiment of the present invention.

Figure 17:
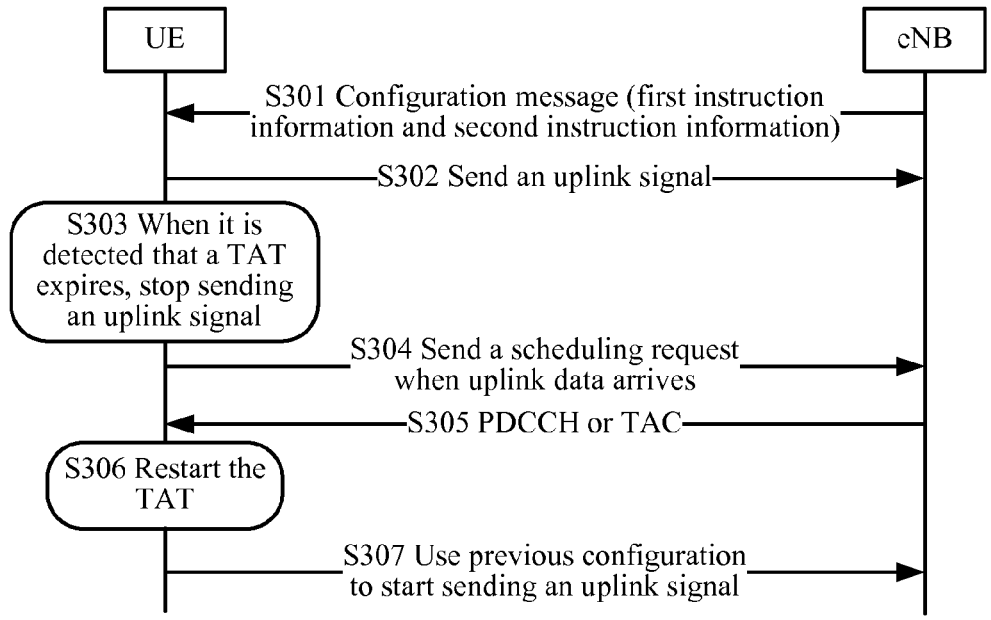
FIG. 17 is a schematic flowchart of a method for controlling uplink signal transmission according to still another embodiment of the present invention.

The following describes a method 300 for controlling uplink signal transmission according to another embodiment of the present invention by using an example in which the first timer is a TAT. As shown in FIG. 17, the method 300 includes the following steps.

S301. A base station sends a configuration message to a user equipment UE.

The configuration message may carry uplink signal configuration information, first instruction information, second instruction information, and scheduling request configuration information, where the first instruction information is used to instruct the UE to send, after the TAT expires and is restarted, an uplink signal according to the uplink signal configuration information, and the second instruction information is used to instruct the user equipment to directly send, when there is uplink data, a scheduling request to the base station without performing random access.

S302. The UE sends an uplink signal to the base station according to the uplink signal configuration message.

S303. When detecting that the TAT expires, the UE stops sending an uplink signal.

S304. The UE sends a scheduling request to the base station according to the second instruction information and scheduling request configuration information when uplink data arrives.

S305. The base station sends a PDCCH or a TAC to the UE according to the scheduling request.

S306. The UE restarts the TAT according to the PDCCH or the TAC.

S307. The UE sends the uplink signal to the base station according to the first instruction information.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Figure 18:
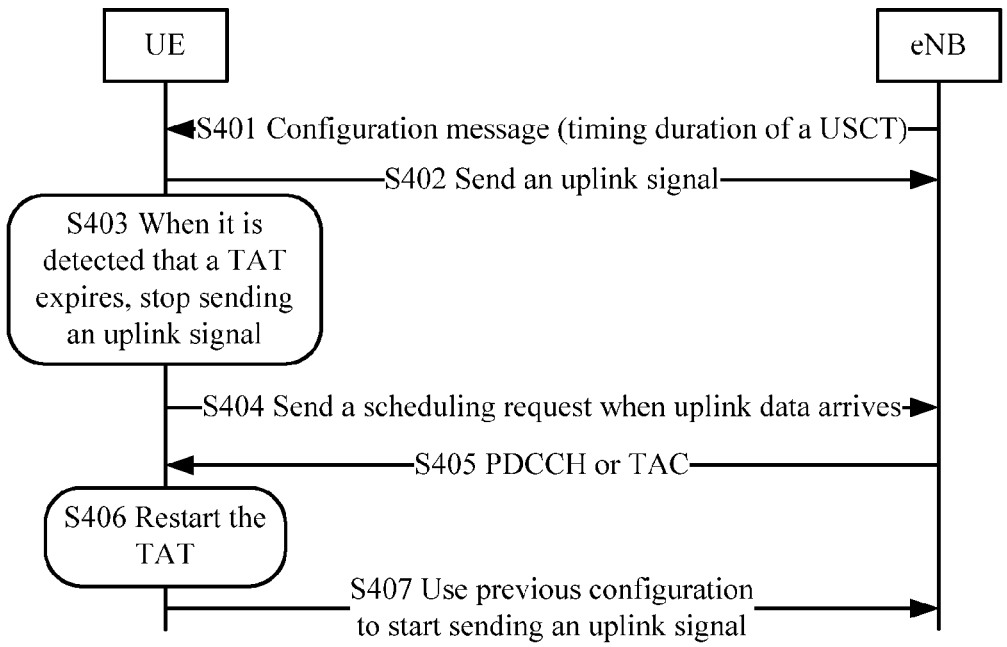
FIG. 18 is a schematic flowchart of a method for controlling uplink signal transmission according to still another embodiment of the present invention.

The following describes a method 400 for controlling uplink signal transmission according to another embodiment of the present invention by using an example in which the first timer is a USCT. It can be seen from FIG. 18 that a process of the method 400 is basically consistent with that of the method 300, and the only difference lies in that a configuration message sent by a base station to a UE may carry only uplink signal configuration information, timing duration of the USCT, and scheduling request configuration information. For brevity, details are not described herein again.

Figure 19:
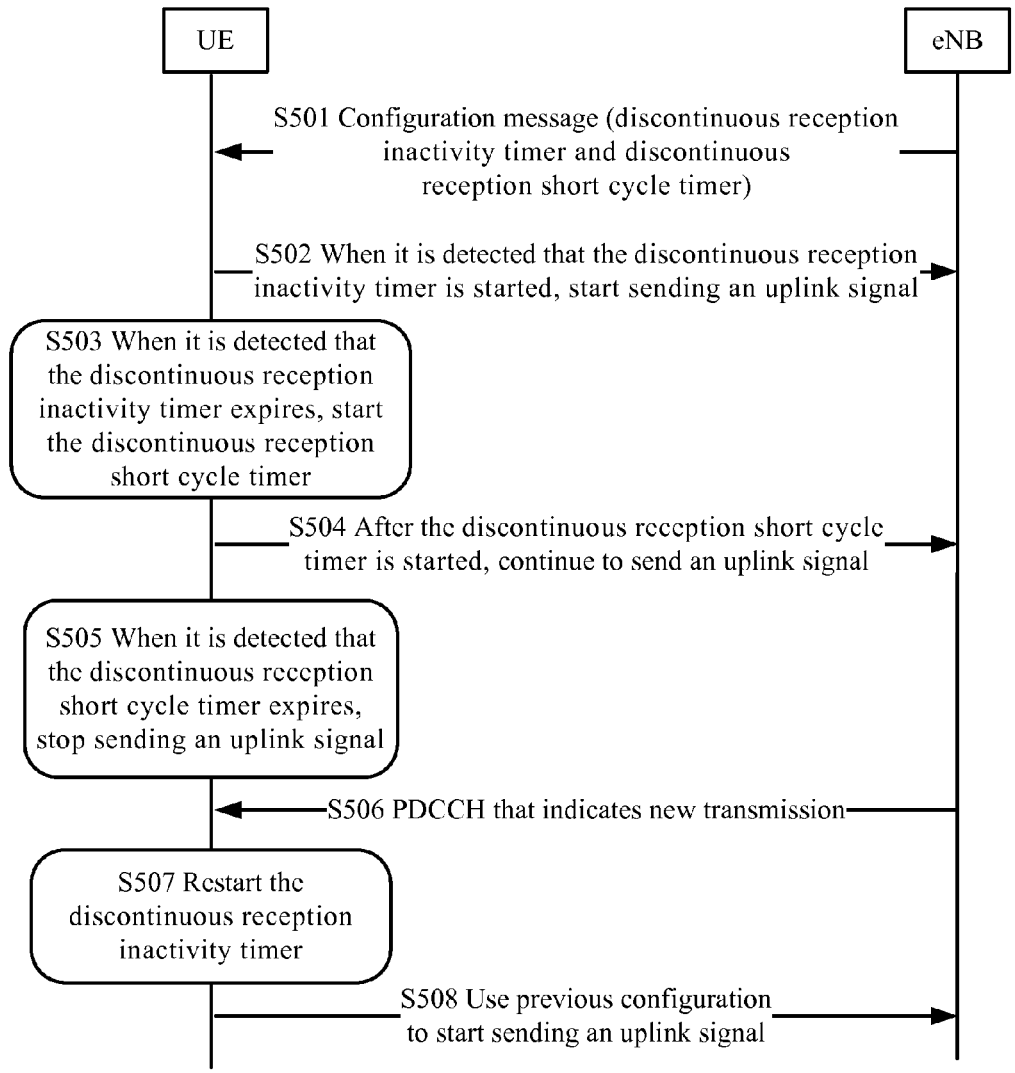
FIG. 19 is a schematic flowchart of a method for controlling uplink signal transmission according to still another embodiment of the present invention.

The following describes a method 500 for controlling uplink signal transmission according to another embodiment of the present invention by using an example in which the first timer is a drx-InactivityTimer. As shown in FIG. 19, the method 500 includes the following steps.

S501. A base station sends a configuration message to a user equipment UE.

The configuration message may carry uplink signal configuration information, timing duration of a drx-ShortCycleTimer, and timing duration of the drx-InactivityTimer.

S502. When detecting that the drx-InactivityTimer is started, the UE sends an uplink signal to the base station according to the uplink signal configuration message.

S503. After detecting that the drx-InactivityTimer expires, the UE starts a drx-ShortCycleTimer.

S504. After the drx-ShortCycleTimer is started, the UE continues to send an uplink signal to the base station.

S505. After detecting that the drx-ShortCycleTimer expires, the UE stops sending an uplink signal.

S506. The base station sends a PDCCH to the UE, where the PDCCH indicates new uplink or downlink transmission.

S507. The UE restarts the drx-InactivityTimer according to the PDCCH.

S508. The UE sends an uplink signal to the base station by using the uplink signal configuration information.

Therefore, according to the method for controlling uplink signal transmission in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 20:
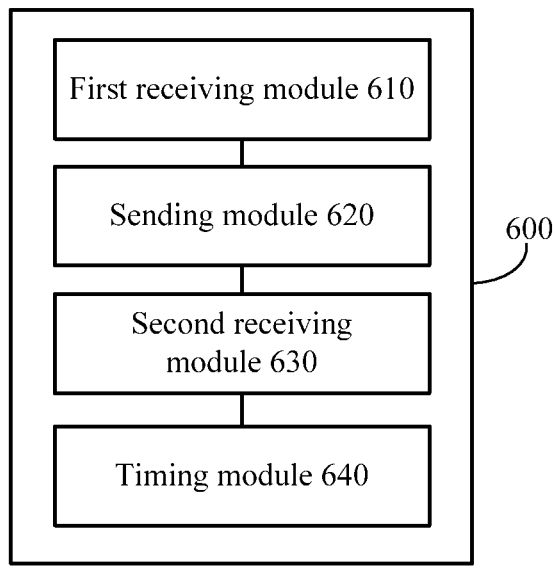
FIG. 20 is a schematic block diagram of a user equipment according to an embodiment of the present invention.
Figure 21:
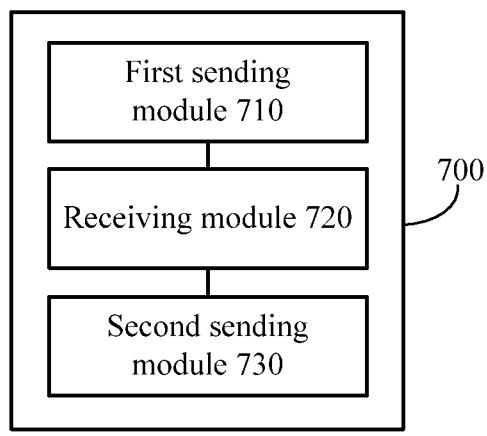
FIG. 21 is a schematic block diagram of a base station according to an embodiment of the present invention.
Figure 22:
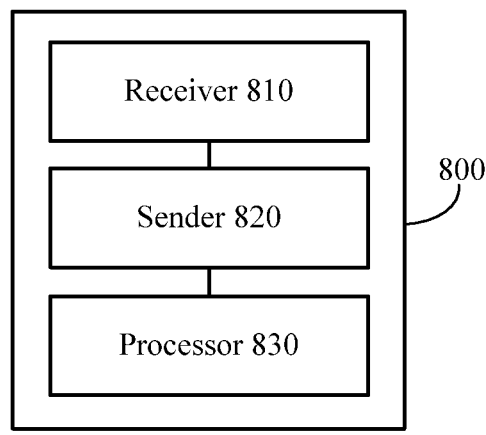
FIG. 22 is a schematic block diagram of a user equipment according to another embodiment of the present invention.

With reference to FIG. 1 to FIG. 19, the foregoing describes in detail the method for controlling uplink signal transmission according to the embodiments of the present invention. With reference to FIG. 20 to FIG. 22, the following describes a user equipment and a base station according to embodiments of the present invention.

FIG. 20 shows a schematic block diagram of a user equipment 600 according to an embodiment of the present invention. As shown in FIG. 20, the user equipment 600 includes a first receiving module 610, a sending module 620, a second receiving module 630, and a timing module 640.

The first receiving module 610 is configured to receive uplink signal configuration information sent by a base station.

The sending module 620 is configured to send an uplink signal to the base station before a first timer expires and according to the uplink signal configuration information received by the first receiving module 610, and to stop sending an uplink signal to the base station when the first timer expires.

The second receiving module 630 is configured to receive trigger information sent by the base station.

The timing module 640 is configured to: restart the first timer according to the trigger information received by the second receiving module 630, and to turn off the first timer when the first timer expires.

The sending module 620 is further configured to send an uplink signal to the base station before the first timer restarted by the timing module 640 expires.

The uplink signal may include at least one of an SRS and a CQI. The uplink signal configuration information may include at least one type of the following configuration information: SRS configuration and CQI reporting configuration. However, this embodiment of the present invention is not limited thereto.

Optionally, the first timer may be a time alignment timer TAT; the first receiving module 610 is further configured to receive first instruction information sent by the base station, where the first instruction information is used to instruct the user equipment to send, according to the uplink signal configuration information and before the time alignment timer restarted by the timing module expires, the uplink signal to the base station.

The sending module 620 is specifically configured to: before the time alignment timer restarted by the timing module 640 expires, send the uplink signal to the base station according to a timing advance value of the user equipment and the first instruction information received by the first receiving module 610.

Optionally, in another embodiment, the second receiving module 630 is further configured to receive configuration valid indication information sent by the base station, where the configuration valid indication information is used to indicate whether the uplink signal configuration information of the user equipment is valid.

Optionally, in another embodiment, when the first timer is a time alignment timer TAT, the user equipment 600 further includes a releasing module 650.

The releasing module 650 is configured to, when the time alignment timer expires, to release the uplink signal configuration information received by the first receiving module 610.

The first receiving module 610 is further configured to receive uplink signal reconfiguration information sent by the base station.

The sending module 620 is specifically configured to: before the time alignment timer restarted by the timing module 640 expires, send the uplink signal to the base station according to a timing advance value of the user equipment and the uplink signal reconfiguration information received by the first receiving module 610.

Optionally, the trigger information may be a physical downlink control channel PDCCH or a timing advance command TAC, which is not limited in this embodiment of the present invention.

Optionally, in another embodiment, the first receiving module 610 is further configured to receive second instruction information and scheduling request configuration information that are sent by the base station, where the second instruction information is used to instruct the user equipment to send, when uplink data arrives, a scheduling request to the base station.

The sending module 620 is further configured to: when uplink data arrives, send a scheduling request to the base station according to the second instruction information and the scheduling request configuration information that are received by the first receiving module 610.

The second receiving module 630 is specifically configured to receive the trigger information sent by the base station according to the scheduling request.

Optionally, in another embodiment, when the first timer is a time alignment timer TAT, the first receiving module 610 is further configured to receive first instruction information sent by the base station, where the first instruction information is used to instruct the user equipment to send, according to the uplink signal configuration information and before the restarted time alignment timer expires, the uplink signal to the base station.

The second receiving module 630 is specifically configured to receive a timing advance command sent by the base station.

The sending module 620 is specifically configured to: before the time alignment timer restarted by the timing module 640 expires, send the uplink signal to the base station according to the timing advance command received by the second receiving module 630 and the first instruction information received by the first receiving module.

Optionally, in another embodiment, the sending module 620 is further configured to send a random access request message to the base station when the time alignment timer expires and uplink data arrives.

The second receiving module 630 is specifically configured to receive a random access response message sent by the base station according to the random access request message, where the random access response message carries the timing advance command.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

Optionally, in another embodiment, the first timer may be an uplink signal control timer, where the uplink signal control timer is used to control whether the user equipment sends the uplink signal to the base station. Correspondingly, the first receiving module 610 is specifically configured to receive timing duration of the uplink signal control timer sent by the base station.

The sending module 620 is specifically configured to: before the uplink signal control timer restarted by the timing module 640 expires, send the uplink signal to the base station according to a timing advance value of the user equipment and the uplink signal configuration information.

Optionally, the timing duration of the uplink signal control timer is shorter than timing duration of the time alignment timer of the user equipment.

Optionally, in another embodiment, the first receiving module 610 is further configured to receive scheduling request configuration information sent by the base station.

The sending module 620 is further configured to: when uplink data arrives, send a scheduling request to the base station according to the scheduling request configuration information received by the first receiving module 610.

The second receiving module 630 is specifically configured to receive the trigger information sent by the base station according to the scheduling request.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

Optionally, in another embodiment, the first timer may be a discontinuous reception inactivity timer. Correspondingly, the first receiving module 610 is further configured to receive timing durations, sent by the base station, of the discontinuous reception inactivity timer and a discontinuous reception short cycle timer of the user equipment.

The timing module 640 is further configured to: start the discontinuous reception short cycle timer when the discontinuous reception inactivity timer expires, and restart the discontinuous reception short cycle timer when the restarted discontinuous reception inactivity timer expires.

The sending module 620 is further configured to: send the uplink signal to the base station according to the uplink signal configuration information before the discontinuous reception short cycle timer expires, and send the uplink signal to the base station according to a timing advance value of the user equipment and the uplink signal configuration information before the restarted discontinuous reception short cycle timer expires.

Optionally, in another embodiment, the first receiving module 610 is further configured to receive on/off instruction information sent by the base station, where the on/off instruction information is used to instruct the user equipment to stop, when the discontinuous reception inactivity timer expires and the discontinuous reception short cycle timer expires, sending the uplink signal.

The sending module 620 is specifically configured to: when the discontinuous reception inactivity timer expires and the discontinuous reception short cycle timer expires, and when the first receiving module 610 receives the on/off instruction information sent by the base station, stop sending the uplink signal to the base station.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

The user equipment 600 according to this embodiment of the present invention may be corresponding to a user equipment in a method for controlling uplink signal transmission according to an embodiment of the present invention, and the foregoing and other operations and/or functions of the modules in the user equipment 600 are respectively used to implement corresponding processes of the methods in FIG. 1 to FIG. 8. For brevity, details are not described herein again.

FIG. 21 shows a schematic block diagram of a base station 700 according to an embodiment of the present invention. As shown in FIG. 21, the base station 700 includes a first sending module 710, a receiving module 720, and a second sending module 730.

The first sending module 710 is configured to send uplink signal configuration information to a user equipment.

The receiving module 720 is configured to receive an uplink signal that is sent by the user equipment before a first timer expires and according to the uplink signal configuration information sent by the first sending module 710.

The second sending module 730 is configured to send trigger information to the user equipment after the first timer expires, where the trigger information is used to trigger the user equipment to restart the first timer.

The receiving module 720 is further configured to receive an uplink signal that is sent by the user equipment before the restarted first timer expires.

Optionally, the first timer may be a time alignment timer TAT; the first sending module 710 is further configured to send first instruction information to the user equipment, where the first instruction information is used to instruct the user equipment to send, according to the uplink signal configuration information and before the restarted time alignment timer expires, the uplink signal.

The receiving module 720 is specifically configured to receive the uplink signal that is sent by the user equipment before the restarted time alignment timer expires and according to a timing advance value of the user equipment and the first instruction information sent by the first sending module.

Optionally, in another embodiment, the second sending module 730 is further configured to send configuration valid indication information to the user equipment, where the configuration valid indication information is used to indicate whether the uplink signal configuration information of the user equipment is valid.

Optionally, in another embodiment, when the first timer is a time alignment timer TAT, the first sending module 710 is further configured to send uplink signal reconfiguration information to the user equipment.

The receiving module 720 is specifically configured to receive the uplink signal that is sent by the user equipment before the restarted time alignment timer expires and according to a timing advance value of the user equipment and the uplink signal reconfiguration information sent by the first sending module 710.

Optionally, in another embodiment, the first sending module 710 is further configured to send second instruction information and scheduling request configuration information to the user equipment, where the second instruction information is used to instruct the user equipment to send, when uplink data arrives, a scheduling request to the base station.

The receiving module 720 is further configured to receive a scheduling request that is sent by the user equipment according to the second instruction information and the scheduling request configuration information that are sent by the first sending module 710.

The second sending module 730 is specifically configured to send the trigger information to the user equipment according to the scheduling request received by the second receiving module 730.

Optionally, the trigger information is a physical downlink control channel PDCCH or a timing advance command TAC, which is not limited in this embodiment of the present invention.

Optionally, in another embodiment, the first timer may be a time alignment timer; the first sending module 710 is further configured to send first instruction information to the user equipment, where the first instruction information is used to instruct the user equipment to send, according to the uplink signal configuration information and before the restarted time alignment timer expires, the uplink signal.

The second sending module 730 is specifically configured to send a timing advance command to the user equipment.

The receiving module 720 is specifically configured to receive the uplink signal that is sent by the user equipment before the restarted time alignment timer expires and according to the timing advance command sent by the second sending module 730 and the first instruction information sent by the first sending module 710.

Optionally, in another embodiment, the receiving module 720 is further configured to receive a random access request message sent by the user equipment.

The second sending module 730 is specifically configured to send a random access response message to the user equipment according to the random access request message, where the random access response message carries the timing advance command.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Optionally, in another embodiment, the first timer may be an uplink signal control timer, where the uplink signal control timer is used to control whether the user equipment sends the uplink signal to the base station. Correspondingly, the first sending module 710 is further configured to send timing duration of the uplink signal control timer to the user equipment.

The receiving module 720 is specifically configured to receive the uplink signal that is sent by the user equipment according to a timing advance value of the user equipment and the uplink signal configuration information before the restarted uplink signal control timer expires.

The timing duration of the uplink signal control timer is shorter than timing duration of the time alignment timer of the user equipment.

Optionally, in another embodiment, the first sending module 710 is further configured to send scheduling request configuration information to the user equipment.

The receiving module 720 is further configured to receive a scheduling request that is sent by the user equipment according to the scheduling request configuration information.

The second sending module 730 is specifically configured to send the trigger information to the user equipment according to the scheduling request received by the receiving module 720.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Optionally, in another embodiment, the first timer may be a discontinuous reception inactivity timer. Correspondingly, the first sending module 710 is further configured to send timing durations of the discontinuous reception inactivity timer and a discontinuous reception short cycle timer of the user equipment to the user equipment.

The receiving module 720 is further configured to: receive the uplink signal that is sent by the user equipment according to the uplink signal configuration information when the discontinuous reception inactivity timer expires and before the discontinuous reception short cycle timer expires, and receive the uplink signal that is sent by the user equipment according to a timing advance value of the user equipment and the uplink signal configuration information when the restarted discontinuous reception inactivity timer expires and before the restarted discontinuous reception short cycle timer expires.

The timing duration of the discontinuous reception inactivity timer and the timing duration of the discontinuous reception short cycle timer are shorter than timing duration of a time alignment timer of the user equipment.

Optionally, in another embodiment, the first sending module 710 is further configured to send on/off instruction information to the user equipment, where the on/off instruction information is used to instruct the user equipment to stop, when the discontinuous reception inactivity timer expires and the discontinuous reception short cycle timer expires, sending the uplink signal.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

The base station 700 according to this embodiment of the present invention may be corresponding to a base station in a method for controlling uplink signal transmission according to an embodiment of the present invention, and the foregoing and other operations and/or functions of the modules in the base station 700 are respectively used to implement corresponding processes of the methods in FIG. 9 to FIG. 16. For brevity, details are not described herein again.

FIG. 22 is a schematic block diagram of a user equipment 800 according to another embodiment of the present invention. As shown in the figure, the user equipment 800 includes a receiver 810, a sender 820, and a processor 830.

The receiver 810 is configured to receive uplink signal configuration information sent by a base station.

The sender 820 is configured to send an uplink signal to the base station before a first timer expires and according to the uplink signal configuration information received by the receiver 810, and stop sending an uplink signal to the base station when the first timer expires.

The receiver 810 is further configured to receive trigger information sent by the base station.

The processor 830 is configured to: restart the first timer according to the trigger information received by the receiver 810, and turn off the first timer when the first timer expires.

The sender 820 is further configured to send an uplink signal to the base station before the first timer restarted by the processor 830 expires.

Optionally, the first timer may be a time alignment timer TAT. The receiver 810 is further configured to receive first instruction information sent by the base station, where the first instruction information is used to instruct the user equipment to send, according to the uplink signal configuration information and before the time alignment timer restarted by the processor 830 expires, the uplink signal to the base station.

The sender 820 is specifically configured to: before the time alignment timer restarted by the processor 830 expires, send the uplink signal to the base station according to a timing advance value of the user equipment and the first instruction information received by the receiver 810.

Optionally, in another embodiment, the first timer may be a time alignment timer TAT. The processor 830 is further configured to release the uplink signal configuration information when the time alignment timer expires.

The receiver 810 is further configured to receive uplink signal reconfiguration information sent by the base station.

The sender 820 is specifically configured to send the uplink signal to the base station according to a timing advance value of the user equipment and the uplink signal reconfiguration information before the time alignment timer restarted by the processor 830 expires.

Optionally, in another embodiment, the receiver 810 is further configured to receive second instruction information and scheduling request configuration information that are sent by the base station, where the second instruction information is used to instruct the user equipment to send, when uplink data arrives, a scheduling request to the base station.

The sender 820 is further configured to, when uplink data arrives, send a scheduling request to the base station according to the second instruction information and the scheduling request configuration information that are received by the receiver 810.

The receiver 810 is further configured to receive the trigger information sent by the base station according to the scheduling request.

Optionally, the trigger information may be a physical downlink control channel PDCCH or a timing advance command TAC, which is not limited in this embodiment of the present invention.

Optionally, in another embodiment, the first timer may be a time alignment timer TAT. The receiver 810 is further configured to receive first instruction information sent by the base station, where the first instruction information is used to instruct the user equipment to send, according to the uplink signal configuration information and before the restarted time alignment timer expires, the uplink signal to the base station; and receive a timing advance command sent by the base station.

The sender 820 is specifically configured to, before the time alignment timer restarted by the processor 830 expires, send the uplink signal to the base station according to the timing advance command and the first instruction information that are received by the receiver 810.

Optionally, in another embodiment, the sender 820 is further configured to send a random access request message to the base station when the time alignment timer expires and uplink data arrives.

The receiver 810 is further configured to receive a random access response message sent by the base station according to the random access request message, where the random access response message carries the timing advance command.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

Optionally, in another embodiment, the first timer may be an uplink signal control timer, where the uplink signal control timer is used to control whether the user equipment sends the uplink signal to the base station. Correspondingly, the receiver 810 is specifically configured to receive timing duration of the uplink signal control timer sent by the base station.

The sender 820 is specifically configured to send the uplink signal to the base station according to a timing advance value of the user equipment and the uplink signal configuration information before the uplink signal control timer restarted by the processor 830 expires.

The timing duration of the uplink signal control timer is shorter than timing duration of the time alignment timer of the user equipment.

Optionally, in another embodiment, the receiver 810 is further configured to receive scheduling request configuration information sent by the base station.

The sender 820 is further configured to: when uplink data arrives, send a scheduling request to the base station according to the scheduling request configuration information received by the receiver 810.

The receiver 810 is further configured to receive the trigger information sent by the base station according to the scheduling request.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

Optionally, in another embodiment, the first timer may be a discontinuous reception inactivity timer. Correspondingly, the receiver 810 is further configured to receive timing durations, sent by the base station, of the discontinuous reception inactivity timer and a discontinuous reception short cycle timer of the user equipment.

The processor 830 is further configured to start the discontinuous reception short cycle timer when the discontinuous reception inactivity timer expires, and restart the discontinuous reception short cycle timer when the restarted discontinuous reception inactivity timer expires.

The sender 820 is further configured to: send the uplink signal to the base station according to the uplink signal configuration information before the discontinuous reception short cycle timer expires, and send the uplink signal to the base station according to a timing advance value of the user equipment and the uplink signal configuration information before the restarted discontinuous reception short cycle timer expires.

The timing duration of the discontinuous reception inactivity timer and the timing duration of the discontinuous reception short cycle timer are shorter than timing duration of a time alignment timer of the user equipment.

Optionally, in another embodiment, the receiver 810 is further configured to receive on/off instruction information sent by the base station, where the on/off instruction information is used to instruct the user equipment to stop, when the discontinuous reception inactivity timer expires and the discontinuous reception short cycle timer expires, sending the uplink signal.

The sender 820 is specifically configured to: when the discontinuous reception inactivity timer expires and the discontinuous reception short cycle timer expires, and when the receiver receives the on/off instruction information sent by the base station, stop sending the uplink signal to the base station.

Therefore, by using the user equipment in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of the user equipment, extending standby time of the user equipment, and enhancing user experience.

The user equipment 800 according to this embodiment of the present invention may be corresponding to a user equipment in a method for controlling uplink signal transmission according to an embodiment of the present invention, and the foregoing and other operations and/or functions of the modules in the user equipment 800 are respectively used to implement corresponding processes of the methods in FIG. 1 to FIG. 8. For brevity, details are not described herein again.

Figure 23:
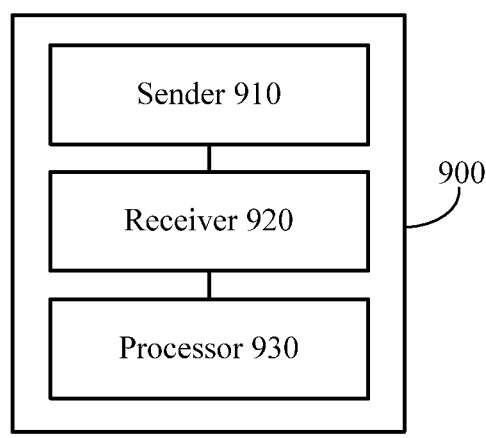
FIG. 23 is a schematic block diagram of a base station according to another embodiment of the present invention.

FIG. 23 shows a schematic block diagram of a base station 900 according to another embodiment of the present invention. As shown in FIG. 23, the base station 900 includes a sender 910, a receiver 920, and a processor 930.

The sender 910 is configured to send uplink signal configuration information to a user equipment.

The receiver 920 is configured to receive an uplink signal that is sent by the user equipment before a first timer expires and according to the uplink signal configuration information sent by the sender 910.

The processor 930 is configured to generate trigger information after the first timer expires, where the trigger information is used to trigger the user equipment to restart the first timer.

The sender 910 is further configured to send, to the user equipment, the trigger information generated by the processor 930.

The receiver 920 is further configured to receive an uplink signal that is sent by the user equipment before the restarted first timer expires.

Optionally, the first timer may be a time alignment timer TAT. The sender 910 is further configured to send first instruction information to the user equipment, where the first instruction information is used to instruct the user equipment to send, according to the uplink signal configuration information and before the restarted time alignment timer expires, the uplink signal.

The receiver 920 is specifically configured to receive the uplink signal that is sent by the user equipment according to a timing advance value of the user equipment and the first instruction information before the restarted time alignment timer expires.

Optionally, in another embodiment, the first timer may be a time alignment timer; the sender 910 is further configured to send uplink signal reconfiguration information to the user equipment.

The receiver 920 is specifically configured to receive the uplink signal that is sent by the user equipment before the restarted time alignment timer expires and according to a timing advance value of the user equipment and the uplink signal reconfiguration information sent by the sender 910.

Optionally, in another embodiment, the sender 910 is further configured to send second instruction information and scheduling request configuration information to the user equipment, where the second instruction information is used to instruct the user equipment to send, when uplink data arrives, a scheduling request to the base station.

The receiver 920 is further configured to receive a scheduling request that is sent by the user equipment according to the second instruction information and the scheduling request configuration information that are sent by the sender 910.

The sender 910 is further configured to send the trigger information to the user equipment according to the scheduling request received by the receiver 920.

Optionally, the trigger information may be a physical downlink control channel PDCCH or a timing advance command TAC, which is not limited in this embodiment of the present invention.

Optionally, in another embodiment, the first timer may be a time alignment timer. The sender 910 is further configured to: send first instruction information to the user equipment, where the first instruction information is used to instruct the user equipment to send, according to the uplink signal configuration information and before the restarted time alignment timer expires, the uplink signal; and send a timing advance command to the user equipment.

The receiver 920 is specifically configured to receive the uplink signal that is sent by the user equipment before the restarted time alignment timer expires and according to the timing advance command and the first instruction information that are sent by the sender 910.

Optionally, in another embodiment, the receiver 920 is further configured to receive a random access request message sent by the user equipment.

The sender 910 is specifically configured to send a random access response message to the user equipment according to the random access request message received by the receiver 920, where the random access response message carries the timing advance command.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Optionally, in another embodiment, the first timer may be an uplink signal control timer, where the uplink signal control timer is used to control whether the user equipment sends the uplink signal to the base station. Correspondingly, the sender 910 is further configured to send timing duration of the uplink signal control timer to the user equipment.

The receiver 920 is specifically configured to receive the uplink signal that is sent by the user equipment according to a timing advance value of the user equipment and the uplink signal configuration information before the restarted uplink signal control timer expires.

The timing duration of the uplink signal control timer is shorter than timing duration of the time alignment timer of the user equipment.

Optionally, in another embodiment, the sender 910 is further configured to send scheduling request configuration information to the user equipment.

The receiver 920 is further configured to receive a scheduling request that is sent by the user equipment according to the scheduling request configuration information.

The sender 910 is further configured to send the trigger information to the user equipment according to the scheduling request received by the receiver.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

Optionally, in another embodiment, the first timer may be a discontinuous reception inactivity timer. Correspondingly, the sender 910 is further configured to send timing durations of the discontinuous reception inactivity timer and a discontinuous reception short cycle timer of the user equipment to the user equipment.

The receiver 920 is further configured to: receive the uplink signal that is sent by the user equipment according to the uplink signal configuration information when the discontinuous reception inactivity timer expires and before the discontinuous reception short cycle timer expires, and receive the uplink signal that is sent by the user equipment according to a timing advance value of the user equipment and the uplink signal configuration information when the restarted discontinuous reception inactivity timer expires and before the restarted discontinuous reception short cycle timer expires.

The timing duration of the discontinuous reception inactivity timer and the timing duration of the discontinuous reception short cycle timer are shorter than timing duration of a time alignment timer of the user equipment.

Optionally, in another embodiment, the sender 910 is further configured to send on/off instruction information to the user equipment, where the on/off instruction information is used to instruct the user equipment to stop, when the discontinuous reception inactivity timer expires and the discontinuous reception short cycle timer expires, sending the uplink signal.

Therefore, by using the base station in this embodiment of the present invention, a random access procedure and/or sending of uplink signal reconfiguration information can be not performed when a timer for controlling uplink signal sending is restarted, thereby reducing sending of control signaling and a useless uplink signal, reducing system overheads, reducing a control delay, speeding up sending of uplink and downlink data, saving battery power of a user equipment, extending standby time of the user equipment, and enhancing user experience.

The base station 900 according to this embodiment of the present invention may be corresponding to a base station in a method for controlling uplink signal transmission according to an embodiment of the present invention, and the foregoing and other operations and/or functions of the modules in the base station 900 are respectively used to implement corresponding processes of the methods in FIG. 9 to FIG. 16. For brevity, details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that, determining B according to A does not mean that B is determined according to A only, instead, B may also be determined according to A and/or other information.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the purposes of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling uplink signal transmission, the method comprising:
   receiving, by a user equipment, uplink signal configuration information sent by a base station;
   sending, by the user equipment, an uplink signal to the base station according to the uplink signal configuration information before a first timer expires;
   stopping, by the user equipment, the sending of the uplink signal to the base station when the first timer expires;
   receiving, by the user equipment, trigger information sent by the base station after the first timer expires, the trigger information being sent according to a scheduling request sent by the user equipment to the base station, and the trigger information triggering the user equipment to restart the first timer so that the user equipment accesses the base station without initiating a random access procedure after the first timer expires;
   restarting, by the user equipment, the first timer according to the trigger information; and
   sending, by the user equipment, the uplink signal to the base station before the restarted first timer expires.

2. The method according to claim 1, wherein the first timer is a time alignment timer;
   wherein the method further comprises receiving first instruction information sent by the base station, wherein the first instruction information is used to instruct the user equipment to send, according to the uplink signal configuration information and before the restarted first timer expires, the uplink signal to the base station; and
   wherein sending the uplink signal to the base station comprises sending the uplink signal to the base station according to a timing advance value of the user equipment and the first instruction information before the restarted first timer expires.

3. The method according to claim 2, wherein the method further comprises:
   receiving second instruction information and scheduling request configuration information that are sent by the base station, wherein the second instruction information is used to instruct the user equipment to send, when uplink data arrives, the scheduling request to the base station; and
   sending the scheduling request to the base station according to the second instruction information and the scheduling request configuration information when uplink data arrives; and
   wherein receiving trigger information sent by the base station comprises receiving the trigger information sent by the base station according to the scheduling request.

4. The method according to claim 1, wherein the first timer is an uplink signal control timer;
   wherein the uplink signal control timer is used to control whether the user equipment sends the uplink signal to the base station;
   wherein the method further comprises receiving timing duration of the uplink signal control timer sent by the base station; and
   wherein sending the uplink signal to the base station before the restarted first timer expires comprises sending the uplink signal to the base station according to a timing advance value of the user equipment and the uplink signal configuration information before the restarted uplink signal control timer expires.

5. The method according to claim 1, wherein the first timer is a discontinuous reception inactivity timer;
   wherein the method further comprises:
   receiving timing durations, sent by the base station, of the discontinuous reception inactivity timer and a discontinuous reception short cycle timer of the user equipment;
   starting the discontinuous reception short cycle timer when the discontinuous reception inactivity timer expires;
   sending the uplink signal to the base station according to the uplink signal configuration information before the discontinuous reception short cycle timer expires;
   restarting the discontinuous reception short cycle timer when the restarted discontinuous reception inactivity timer expires; and
   sending the uplink signal to the base station according to a timing advance value of the user equipment and the uplink signal configuration information before the restarted discontinuous reception short cycle timer expires; and
   wherein stopping the sending of the uplink signal comprises stopping the sending of the uplink signal to the base station when the discontinuous reception inactivity timer expires and the discontinuous reception short cycle timer expires.

6. The method according to claim 5, wherein stopping the sending of the uplink signal comprises stopping the sending of the uplink signal to the base station when the discontinuous reception inactivity timer expires and the discontinuous reception short cycle timer expires and when on/off instruction information sent by the base station is received, wherein the on/off instruction information is used to instruct the user equipment to stop, when the discontinuous reception inactivity timer expires and the discontinuous reception short cycle timer expires, sending the uplink signal.

7. A method for controlling uplink signal transmission, the method comprising:
   sending, by a base station, uplink signal configuration information to a user equipment;
   receiving, by the base station, an uplink signal that is sent by the user equipment according to the uplink signal configuration information before a first timer expires;
   sending, by the base station, trigger information to the user equipment according to a scheduling request of the user equipment after the first timer expires, wherein the trigger information is used to trigger the user equipment to restart the first timer so that the user equipment accesses the base station without a need of initiating a random access procedure after the first timer expires; and
   receiving, by the base station, an uplink signal that is sent by the user equipment before the restarted first timer expires.

8. The method according to claim 7, wherein the first timer is a time alignment timer;
    wherein the method further comprises sending first instruction information to the user equipment, wherein the first instruction information is used to instruct the user equipment to send, according to the uplink signal configuration information and before the restarted first timer expires, the uplink signal; and
    wherein receiving the uplink signal that is sent by the user equipment comprises receiving the uplink signal that is sent by the user equipment according to a timing advance value of the user equipment and the first instruction information before the restarted first timer expires.

9. The method according to claim 8, wherein the method further comprises:
    sending second instruction information and scheduling request configuration information to the user equipment, wherein the second instruction information is used to instruct the user equipment to send, when uplink data arrives, the scheduling request to a base station; and
    receiving the scheduling request that is sent by the user equipment according to the second instruction information and the scheduling request configuration information.

10. The method according to claim 7, wherein the first timer is an uplink signal control timer;
    wherein the uplink signal control timer is used to control whether a user equipment sends the uplink signal to a base station;
    wherein the method further comprises sending timing duration of the uplink signal control timer to the user equipment; and
    wherein receiving the uplink signal that is sent by the user equipment comprises receiving the uplink signal that is sent by the user equipment according to a timing advance value of the user equipment and the uplink signal configuration information before the restarted uplink signal control timer expires.

11. The method according to claim 7, wherein the first timer is a discontinuous reception inactivity timer and wherein the method further comprises:
    sending timing durations of the discontinuous reception inactivity timer and a discontinuous reception short cycle timer of the user equipment to the user equipment;
    receiving the uplink signal that is sent by the user equipment according to the uplink signal configuration information when the discontinuous reception inactivity timer expires and before the discontinuous reception short cycle timer expires; and
    receiving the uplink signal that is sent by the user equipment according to a timing advance value of the user equipment and the uplink signal configuration information when the restarted discontinuous reception inactivity timer expires and before the restarted discontinuous reception short cycle timer expires.

12. The method according to claim 11, wherein the method further comprises sending on/off instruction information to the user equipment, wherein the on/off instruction information is used to instruct the user equipment to stop, when the discontinuous reception inactivity timer expires and the discontinuous reception short cycle timer expires, sending the uplink signal.

13. A user equipment, comprising a computing device including a non-transitory computer-readable medium storing program modules executable by the computing device, the modules including:
    a first receiving module, configured to receive uplink signal configuration information sent by a base station;
    a sending module, configured to send an uplink signal to the base station before a first timer expires and according to the uplink signal configuration information received by the first receiving module, and to stop sending an uplink signal to the base station when the first timer expires;
    a second receiving module, configured to receive trigger information sent by the base station after the first timer expires, the trigger information being sent according to a scheduling request that is sent by the user equipment to the base station, and the trigger information triggering the user equipment to restart the first timer, wherein the user equipment is able to access the base station after the first timer expires without a need of initiating a random access procedure; and
    a timing module, configured to: restart the first timer according to the trigger information received by the second receiving module, and turn off the first timer when the first timer expires; and
    wherein the sending module is further configured to send an uplink signal to the base station before the first timer restarted by the timing module expires.

14. The user equipment according to claim 13, wherein the first timer is a time alignment timer (TAT);
    wherein the first receiving module is further configured to receive first instruction information sent by the base station, the first instruction information being used to instruct the user equipment to send, according to the uplink signal configuration information and before the time alignment timer restarted by the timing module expires, the uplink signal to the base station; and
    wherein the sending module is configured to, before the time alignment timer restarted by the timing module expires, send the uplink signal to the base station according to a timing advance value of the user equipment and the first instruction information received by the first receiving module.

15. The user equipment according to claim 14, wherein the first receiving module is further configured to receive second instruction information and scheduling request configuration information that are sent by the base station, wherein the second instruction information is used to instruct the user equipment to send, when uplink data arrives, a scheduling request to the base station;
    wherein the sending module is further configured to, when uplink data arrives, send a scheduling request to the base station according to the second instruction information and the scheduling request configuration information that are received by the first receiving module; and
    wherein the second receiving module is specifically configured to receive the trigger information sent by the base station according to the scheduling request.

16. The user equipment according to claim 13, wherein the first timer is an uplink signal control timer that is used to control whether the user equipment sends the uplink signal to the base station;
    wherein the first receiving module is specifically configured to receive timing duration of the uplink signal control timer sent by the base station; and wherein the sending module is specifically configured to send the uplink signal to the base station according to a timing advance value of the user equipment and the uplink signal configuration information before the uplink signal control timer restarted by the timing module expires.

17. The user equipment according to claim 13, wherein the first timer is a discontinuous reception inactivity timer;
wherein the first receiving module is further configured to receive timing durations, sent by the base station, of the discontinuous reception inactivity timer and a discontinuous reception short cycle timer of the user equipment;
wherein the timing module is further configured to start the discontinuous reception short cycle timer when the discontinuous reception inactivity timer expires, and to restart the discontinuous reception short cycle timer when the restarted discontinuous reception inactivity timer expires; and
wherein the sending module is further configured to send the uplink signal to the base station according to the uplink signal configuration information before the discontinuous reception short cycle timer expires, and to send the uplink signal to the base station according to a timing advance value of the user equipment and the uplink signal configuration information before the restarted discontinuous reception short cycle timer expires.

18. The user equipment according to claim 17, wherein the first receiving module is further configured to receive on/off instruction information sent by the base station, wherein the on/off instruction information is used to instruct the user equipment to stop, when the discontinuous reception inactivity timer expires and the discontinuous reception short cycle timer expires, sending the uplink signal; and
wherein the sending module is specifically configured to stop sending the uplink signal to the base station when the discontinuous reception inactivity timer expires and the discontinuous reception short cycle timer expires and when the first receiving module receives the on/off instruction information sent by the base station.

19. A base station, comprising a computing device including a non-transitory computer-readable medium storing program modules executable by the computing device, the modules including:
a first sending module, configured to send uplink signal configuration information to a user equipment;
a receiving module, configured to receive an uplink signal that is sent by the user equipment before a first timer expires and according to the uplink signal configuration information sent by the first sending module; and
a second sending module, configured to send trigger information to the user equipment according to a scheduling request of the user equipment after the first timer expires, wherein the trigger information is used to trigger the user equipment to restart the first timer so that the user equipment accesses the base station without a need of initiating a random access procedure after the first timer expires; and
wherein the receiving module is further configured to receive the uplink signal that is sent by the user equipment before the restarted first timer expires.

20. The base station according to claim 19, wherein the first timer is a time alignment timer;
wherein the first sending module is further configured to send first instruction information to the user equipment, wherein the first instruction information is used to instruct the user equipment to send, according to the uplink signal configuration information and before the restarted first timer expires, the uplink signal; and
wherein the receiving module is specifically configured to receive the uplink signal that is sent by the user equipment before the restarted first timer expires and according to a timing advance value of the user equipment and the first instruction information sent by the first sending module.

21. The base station according to claim 20, wherein the first sending module is further configured to send second instruction information and scheduling request configuration information to the user equipment, wherein the second instruction information is used to instruct the user equipment to send, when uplink data arrives, a scheduling request to the base station;
wherein the receiving module is further configured to receive a scheduling request that is sent by the user equipment according to the second instruction information and the scheduling request configuration information that are sent by the first sending module; and
wherein the second sending module is specifically configured to send the trigger information to the user equipment according to the scheduling request received by the receiving module.

22. The base station according to claim 19, wherein the first timer is an uplink signal control timer, wherein the uplink signal control timer is used to control whether the user equipment sends the uplink signal to the base station;
wherein the first sending module is further configured to send timing duration of the uplink signal control timer to the user equipment; and
wherein the receiving module is specifically configured to receive the uplink signal that is sent by the user equipment according to a timing advance value of the user equipment and the uplink signal configuration information before the restarted uplink signal control timer expires.

23. The base station according to claim 19, wherein the first timer is a discontinuous reception inactivity timer;
wherein the first sending module is further configured to send timing durations of the discontinuous reception inactivity timer and a discontinuous reception short cycle timer of the user equipment to the user equipment; and
wherein the receiving module is further configured to receive the uplink signal that is sent by the user equipment according to the uplink signal configuration information when the discontinuous reception inactivity timer expires and before the discontinuous reception short cycle timer expires, and to receive the uplink signal that is sent by the user equipment according to a timing advance value of the user equipment and the uplink signal configuration information when the restarted discontinuous reception inactivity timer expires and before the restarted discontinuous reception short cycle timer expires.

24. The base station according to claim 23, wherein the first sending module is further configured to send on/off instruction information to the user equipment, wherein the on/off instruction information is used to instruct the user equipment to stop, when the discontinuous reception inactivity timer expires and the discontinuous reception short cycle timer expires, sending the uplink signal.

* * * * *